(12) United States Patent
Fujita

(10) Patent No.: US 7,671,958 B2
(45) Date of Patent: Mar. 2, 2010

(54) LIQUID CRYSTAL DEVICE AND ELECTRONIC APPARATUS

(75) Inventor: Shin Fujita, Suwa (JP)

(73) Assignee: Epson Imaging Devices Corporation, Azumino-Shi (JP)

( * ) Notice: Subject to any disclaimer, the term of this patent is extended or adjusted under 35 U.S.C. 154(b) by 196 days.

(21) Appl. No.: 11/892,288

(22) Filed: Aug. 21, 2007

(65) Prior Publication Data
US 2008/0043196 A1 Feb. 21, 2008

(30) Foreign Application Priority Data

Aug. 21, 2006 (JP) ............... 2006-223920
Jul. 23, 2007 (JP) ............... 2007-190432

(51) Int. Cl.
*G02F 1/1345* (2006.01)
(52) U.S. Cl. ...................................... 349/152
(58) Field of Classification Search ........................ None
See application file for complete search history.

(56) References Cited

U.S. PATENT DOCUMENTS

| | | | |
|---|---|---|---|
| 6,226,060 B1 | 5/2001 | Onisawa et al. | |
| 6,768,531 B2 | 7/2004 | Ochiai et al. | |
| 6,816,222 B2 | 11/2004 | Ono et al. | |
| 6,995,818 B2 | 2/2006 | Ochiai et al. | |
| 7,136,130 B2 | 11/2006 | Ono et al. | |
| 7,209,206 B2 | 4/2007 | Ochiai et al. | |
| 7,295,268 B2 | 11/2007 | Ono et al. | |
| 2003/0103181 A1* | 6/2003 | Imayama et al. | ............ 349/122 |
| 2005/0030461 A1* | 2/2005 | Ono et al. | ................... 349/141 |
| 2005/0213016 A1* | 9/2005 | Yarita et al. | ................... 349/149 |
| 2006/0028606 A1 | 2/2006 | Takeguchi et al. | |
| 2006/0066780 A1 | 3/2006 | Ochiai et al. | |
| 2006/0146256 A1 | 7/2006 | Ahn | |
| 2007/0024789 A1* | 2/2007 | Itou et al. | ................... 349/139 |
| 2007/0030428 A1* | 2/2007 | Lu et al. | ..................... 349/126 |
| 2007/0222907 A1* | 9/2007 | Onogi et al. | .................. 349/42 |
| 2007/0229750 A1* | 10/2007 | Matsuda et al. | ............. 349/141 |

FOREIGN PATENT DOCUMENTS

| | | |
|---|---|---|
| JP | A 2001-059978 | 3/2001 |
| JP | A 2001-235763 | 8/2001 |
| JP | A 2001-311965 | 11/2001 |
| JP | A 2002-182230 | 6/2002 |
| JP | A 2002-333845 | 11/2002 |
| JP | A 2003-015146 | 1/2003 |
| JP | A 2004-157516 | 6/2004 |
| KR | 2002-0063498 | 8/2002 |
| KR | 2003-0011692 | 2/2003 |

* cited by examiner

*Primary Examiner*—Mike Stahl
(74) *Attorney, Agent, or Firm*—Oliff & Berridge, PLC

(57) ABSTRACT

A liquid crystal device includes a first substrate, a second substrate, liquid crystal, a switching element, a signal wiring, a planarizing film, a first electrode, an electrode insulating film, a second electrode, and a terminal. The terminal is provided at least in a portion of a region on the first substrate in which the planarizing film is not formed. The terminal includes a terminal body portion, a terminal insulating film, and a terminal electrode portion. The terminal body portion is made of the same material as that of the signal wiring. The terminal insulating film is made of the same material as that of the electrode insulating film. The terminal electrode portion is made of the same material as that of the second electrode. The terminal electrode portion is electrically connected to the terminal body portion through the opening region.

10 Claims, 26 Drawing Sheets

LIQUID CRYSTAL DEVICE AND ELECTRONIC APPARATUS

BACKGROUND

1. Technical Field

The present invention relates to a liquid crystal device and an electronic apparatus.

2. Related Art

An existing TN (twisted nematic) liquid crystal device has a configuration such that liquid crystal is sealed between a pair of substrates, and an electric field is applied in a direction perpendicular to the surfaces of the substrates by means of electrodes formed on the substrates to control alignment of liquid crystal molecules and thereby modulates light transmittance ratio. In contrast, one type of liquid crystal device that attempts to increase the viewing angle is known, in which the direction in which an electric field is applied to liquid crystal is set in a direction substantially parallel to the surface of the substrate and the liquid crystal is rotated within a plane that is substantially parallel to the substrate using the electric field. In other words, this mode is configured so that a pair of electrodes are formed on one substrate to generate an electric field. As to the mode of this type, an IPS (in-plane switching) mode and an FFS (fringe-field switching) mode are known.

The FFS mode is a technology that is improved from the technology of the IPS mode. The difference in configuration is that the IPS mode has a pair of comb-shaped electrodes formed in the same layer, while, on the other hand, the FFS mode has a pair of electrodes formed in different layers. That is, the FFS mode is configured so that a comb-shaped electrode is formed above a solid electrode through an interlayer insulating film. Due to this difference in electrode structure, a direction of electric field generated slightly differs between the modes. The direction of electric field in the IPS mode is a horizontal direction in which electrodes are opposed to each other, while the electric field in the FFS mode, because electrodes are formed in different layers, has a strong electric field component in a vertical direction relative to the surface of the substrate particularly in proximity to the edges of the electrodes in addition to an electric field component in a horizontal direction. Note that Japanese Unexamined Patent Application Publication No. 2003-15146 describes the shape of an electrode which is one of examples of electrode used in the IPS mode; however, a pair of electrodes are formed in different layers, so that the direction of electric field is similar to that of the FFS mode.

As a result, in the regular IPS mode, even when liquid crystal molecules positioned between the electrodes are driven, liquid crystal molecules positioned just above the electrode are hardly driven. Thus, the electrode portions do not contribute to display, and these portions are screened by a light blocking film, so that the aperture ratio decreases. In contrast, in the case of FFS mode, not only liquid crystal molecules positioned between the electrodes, of course, but also liquid crystal molecules positioned just above the electrode are easily driven. Thus, in the FFS mode, when the electrode is formed of a transparent conductive film, it is possible for electrode portions to contribute to display to a certain degree. The FFS mode is advantageous in that it is possible to increase the aperture ratio in comparison with the IPS mode under the same condition.

Thus, it is effective to employ the FFS mode to attempt to increase the luminance of a liquid crystal device. Here, the switching element of a liquid crystal device uses P—Si (polysilicon) thin-film transistor (hereinafter, referred to as TFT) element, α-Si (amorphous silicon) TFT element, or the like. Then, when the P—Si TFT element is mainly used, a so-called overlayer structure in which an insulating film is formed so as to cover the TFT element, the surface is planarized, and an electrode is formed on the insulating film for driving liquid crystal. However, it is necessary to form a terminal for connection with mounting components such as a driving IC and a flexible substrate in the liquid crystal device.

SUMMARY

An advantage of some aspects of the invention is that it provides a technology for forming an anti-corrosive terminal using a metal film and an insulating film that form scanning lines and/or data lines connected to TFT elements when an overlayer structure is employed.

A first aspect of the invention provides a liquid crystal device. The liquid crystal device includes a first substrate, a second substrate, a switching element, a signal wiring, a planarizing film, a first electrode, an electrode insulating film, a second electrode, and a terminal. The second substrate is opposed to the first substrate. The first substrate and the second substrate hold liquid crystal therebetween. The signal wiring is connected to the switching element. The planarizing film made of insulating film has a flatness and is provided above the signal wiring and the switching element. The first electrode is provided above the planarizing film. The electrode insulating film is provided above the first electrode. The second electrode is provided above the electrode insulating film and has a plurality of slits. The second electrode generates an electric field that passes through the slits between the first electrode and the second electrode. The switching element, the signal wiring, the planarizing film, the first electrode, the electrode insulating film and the second electrode are formed on or above the first substrate. The terminal is provided at least in a portion of a region on the first substrate in which the planarizing film is not formed. The terminal is used for connection with a mounting component. The terminal includes a terminal body portion, a terminal insulating film, and a terminal electrode portion. The terminal body portion is made of the same material as that of the signal wiring. The terminal insulating film is made of the same material as that of the electrode insulating film. The terminal insulating film is formed on the terminal body portion so as to cover a side face of the terminal body portion and to open at an opening region in the terminal body portion. The terminal electrode portion is made of the same material as that of the second electrode. The terminal electrode portion is formed so as to cover the opening region and the side face of the terminal body portion. The terminal electrode portion is electrically connected to the terminal body portion through the opening region.

With this configuration, in an FFS mode liquid crystal device having a planarizing film, because the electrode insulating film provided between the first electrode and the second electrode is arranged in the terminal region (the region in which the planarizing film is not formed) as the terminal insulating film, the terminal insulating film serves as a passivation film for the terminal. In addition, because the connection between the mounting component and the terminal is formed of one layer of the terminal electrode portion, it is possible to ensure a larger area of the connection. Furthermore, because the terminal body portion is made of the same material as that of the signal wiring, they may be formed at the same time, and it is possible to simplify a connection between the terminal and the signal wiring. In the terminal region, when the planarizing film is left, it is necessary to form a through-hole having a few micrometers in the planarizing film. Thus, it is very likely to have a contact failure when connection is made to an electrode located at the bottom of the deep through-hole. Moreover, when the electrode of the terminal is formed using a conductive film for forming the first electrode and the second electrode, there is a possibility that, when the through-hole is deep, it is impossible to ensure electrical reliability due to poor adhesion. In the above configuration, in the terminal region, because the electrode is provided in the region in which the planarizing film is not formed, unevenness of the terminal region is reduced, and it is possible to ensure good conduction at the connection. In addition, because the side face of the terminal body portion is covered with the terminal insulating film and the terminal electrode portion, it is possible to ensure high anti-corrosion.

A second aspect of the invention provides a liquid crystal device. The liquid crystal device includes a first substrate, a second substrate, a switching element, a signal wiring, a planarizing film, a first electrode, an electrode insulating film, a second electrode, and a terminal. The second substrate is opposed to the first substrate. The first substrate and the second substrate hold liquid crystal therebetween. The signal wiring is connected to the switching element. The planarizing film made of insulating film has a flatness and is provided above the signal wiring and the switching element. The first electrode is provided above the planarizing film. The electrode insulating film is provided above the first electrode. The second electrode is provided above the electrode insulating film and has a plurality of slits. The second electrode generates an electric field that passes through the slits between the first electrode and the second electrode. The switching element, the signal wiring, the planarizing film, the first electrode, the electrode insulating film and the second electrode are formed on or above the first substrate. The terminal is provided at least in a portion of a region on the first substrate in which the planarizing film is not formed. The terminal is used for connection with a mounting component. The terminal includes a terminal body portion, a first terminal electrode portion, a terminal insulating film, and a second terminal electrode portion. The terminal body portion is made of the same material as that of the signal wiring. The first terminal electrode portion is made of the same material as that of the first electrode. The first terminal electrode portion is formed so as to cover at least the terminal body portion. The first terminal electrode portion is electrically connected to the terminal body portion. The terminal insulating film is made of the same material as that of the electrode insulating film. The terminal insulating film is formed on the terminal body portion so as to cover a side face of the terminal body portion and to open at an opening region in the terminal body portion. The second terminal electrode portion is made of the same material as that of the second electrode. The second terminal electrode portion is formed so as to cover the opening region and the side face of the terminal body portion. The second terminal electrode portion is electrically connected to the first terminal electrode portion through the opening region.

With this configuration, in an FFS mode liquid crystal device having a planarizing film, because the electrode insulating film provided between the first electrode and the second electrode is arranged in the terminal region (the region in which the planarizing film is not formed) as the terminal insulating film, the terminal insulating film serves as a passivation film for the terminal. In the terminal region, when the planarizing film is left, it is necessary to form a through-hole having a few micrometers in the planarizing film. Thus, it is very likely to have a contact failure when connection is made to an electrode located at the bottom of the deep through-hole. Moreover, when the electrode of the terminal is formed using a conductive film for forming the first electrode and the second electrode, there is a possibility that, when the through-hole is deep, it is impossible to ensure electrical reliability due to poor adhesion. In the above configuration, in the terminal region, because the electrode is provided in the region in which the planarizing film is not formed, unevenness of the terminal region is reduced, and it is possible to ensure good conduction at the connection. In addition, because the side face of the terminal body portion is covered with the first terminal electrode portion, the terminal insulating film and the second terminal electrode portion, it is possible to further ensure high anti-corrosion.

A third aspect of the invention provides a liquid crystal device. The liquid crystal device includes a first substrate, a second substrate, a switching element, a signal wiring, a planarizing film, a first electrode, an electrode insulating film, a second electrode, and a terminal. The second substrate is opposed to the first substrate. The first substrate and the second substrate hold liquid crystal therebetween. The signal wiring is connected to the switching element. The planarizing film made of insulating film has a flatness and is provided above the signal wiring and the switching element. The first electrode is provided above the planarizing film. The electrode insulating film is provided above the first electrode. The second electrode is provided above the electrode insulating film and has a plurality of slits. The second electrode generates an electric field that passes through the slits between the first electrode and the second electrode. The switching element, the signal wiring, the planarizing film, the first electrode, the electrode insulating film and the second electrode are formed on or above the first substrate. The terminal is provided at least in a portion of a region on the first substrate in which the planarizing film is not formed. The terminal is used for connection with a mounting component. The terminal includes a terminal body portion, a first terminal electrode portion, a terminal insulating film, and a second terminal electrode portion. The terminal body portion is made of the same material as that of the signal wiring. The first terminal electrode portion is made of the same material as that of the first electrode. The first terminal electrode portion is formed so as to cover at least a side face of the terminal body portion. The first terminal electrode portion has a first opening region formed on the terminal body portion. The terminal insulating film is made of the same material as that of the electrode insulating film. The terminal insulating film is formed so as to at least cover the first terminal electrode portion. The terminal insulating film has a second opening region within the first opening region. The second terminal electrode portion is made of the same material as that of the second electrode. The second terminal electrode portion is formed at least on the terminal body portion so as to cover the second opening region of the terminal insulating film and the side face of the terminal body portion. The second terminal electrode portion is electrically connected to the terminal body portion through the second opening region.

With this configuration, in an FFS mode liquid crystal device having a planarizing film, because the electrode insulating film provided between the first electrode and the second electrode is arranged in the terminal region (the region in which the planarizing film is not formed) as the terminal insulating film, the terminal insulating film serves as a passivation film for the terminal. In addition, because the connection between the mounting component and the terminal is formed of one layer of the terminal electrode portion, it is possible to ensure a larger area of the connection. Furthermore, because the terminal body portion is made of the same material as that of the signal wiring, they may be formed at the same time, and it is possible to simplify a connection between the terminal and the signal wiring. In the terminal region, when the planarizing film is left, it is necessary to form a through hole having a few micrometers in the planarizing film. Thus, it is very likely to have a contact failure when connection is made to an electrode located at the bottom of the deep through-hole. Moreover, when the electrode of the terminal is formed using a conductive film for forming the first electrode and the second electrode, there is a possibility that, when the through-hole is deep, it is impossible to ensure electrical reliability due to poor adhesion. In the above configuration, in the terminal region, because the electrode is provided in the region in which the planarizing film is not formed, unevenness of the terminal region is reduced, and it is possible to ensure good conduction at the connection. In addition, because the side face of the terminal body portion is covered with the first terminal electrode portion, the terminal insulating film and the second terminal electrode portion, it is possible to further ensure high anti-corrosion.

Here, a scanning line and a data line may be formed on the first substrate and extend to intersect with each other, a terminal wiring that is electrically connected to the terminal may be made of the same material as that of the scanning line, and the terminal body portion may be made of the same material as that of the data line. With this configuration, because the wiring made of the same material as that of the scanning line that is formed in the layer different from the data line may be used as a terminal wiring, a short-circuit does not occur when the terminal is adjacent to the scanning line. Thus, it is possible to increase the possibility of arrangement of the terminal and terminal wiring pattern.

In such a configuration, the liquid crystal device may further include a lower insulating film that is positioned in a lower layer than the first electrode and cover the data line, wherein the side face of the terminal body portion may be covered with the lower insulating film and the terminal insulating film. With this configuration, because two layers, that is, the lower insulating film and the terminal insulating film, serve as a passivation film for the terminal body portion, it is possible to increase anti-corrosion.

In addition, in the above configuration, the terminal wiring that is electrically connected to the terminal and the terminal body portion may be formed in different wiring layers via an interlayer insulating film and the terminal wiring may be positioned in a lower layer than the terminal body portion, wherein the terminal wiring may be electrically connected to the terminal body portion through a through-hole that is formed in the interlayer insulating film. With this configuration, because the terminal wiring and the terminal body portion are reliably electrically connected to each other through the through-hole, it is possible to ensure good electrical conduction. Furthermore, the through-hole may be formed at a position that overlaps the terminal body portion in plan view. Thus, it is possible to project the terminal connection.

A fourth aspect of the invention provides a liquid crystal device. The liquid crystal device includes a first substrate, a second substrate, a switching element, a signal wiring, a planarizing film, a first electrode, an electrode insulating film, a second electrode, and a terminal. The second substrate is opposed to the first substrate. The first substrate and the second substrate hold liquid crystal therebetween. The signal wiring is connected to the switching element. The planarizing film made of insulating film has a flatness and is provided above the signal wiring and the switching element. The first electrode is provided above the planarizing film. The electrode insulating film is provided above the first electrode. The second electrode is provided above the electrode insulating film and has a plurality of slits. The second electrode generates an electric field that passes through the slits between the first electrode and the second electrode. The switching element, the signal wiring, the planarizing film, the first electrode, the electrode insulating film and the second electrode are formed on or above the first substrate. The terminal is provided at least in a portion of a region on the first substrate in which the planarizing film is not formed. The terminal is used for connection with a mounting component. The terminal includes a terminal body portion, and a terminal insulating film. The terminal body portion is made of the same material as that of the signal wiring. The terminal insulating film is made of the same material as that of the electrode insulating film. The terminal insulating film is formed on the terminal body portion so as to at least cover a side face of the terminal body portion.

With this configuration, in an FFS mode liquid crystal device having a planarizing film, because the electrode insulating film provided between the first electrode and the second electrode is arranged in the terminal region (the region in which the planarizing film is not formed) as the terminal insulating film, the terminal insulating film serves as a passivation film for the terminal. In addition, because the connection between the mounting component and the terminal is formed of only the terminal body portion, it is possible to ensure a larger area of the connection. Furthermore, because the terminal body portion is made of the same material as that of the signal wiring, they may be formed at the same time, and it is possible to simplify a connection between the terminal and the signal wiring. In the terminal region, when the planarizing film is left, it is necessary to form a through-hole having a few micrometers in the planarizing film. Thus, it is very likely to have a contact failure when connection is made to an electrode located at the bottom of the deep through-hole. Moreover, when the electrode of the terminal is formed using a conductive film for forming the first electrode and the second electrode, there is a possibility that, when the through-hole is deep, it is impossible to ensure electrical reliability due to poor adhesion. In the above configuration, in the terminal region, because the electrode is provided in the region in which the planarizing film is not formed, unevenness of the terminal region is reduced, and it is possible to ensure good conduction at the connection. In addition, because the side face of the terminal body portion is covered with the terminal insulating film, it is possible to ensure high anti-corrosion.

A fifth aspect of the invention provides a liquid crystal device. The liquid crystal device includes a first substrate, a second substrate, a switching element, a signal wiring, a planarizing film, a first electrode, an electrode insulating film, a second electrode, and a terminal. The second substrate is opposed to the first substrate. The first substrate and the second substrate hold liquid crystal therebetween. The signal wiring is connected to the switching element. The planarizing film made of insulating film has a flatness and is provided above the signal wiring and the switching element. The first electrode is provided above the planarizing film. The electrode insulating film is provided above the first electrode. The second electrode is provided above the electrode insulating film and has a plurality of slits. The second electrode generates an electric field that passes through the slits between the first electrode and the second electrode. The switching element, the signal wiring, the planarizing film, the first electrode, the electrode insulating film and the second electrode are formed on or above the first substrate. The terminal is provided at least in a portion of a region on the first substrate in which the planarizing film is formed. The terminal is used for connection with a mounting component. The terminal includes a terminal body portion, an opening, a terminal insulating film, and a terminal electrode portion. The terminal body portion is made of the same material as that of the signal wiring. The opening opens in the planarizing film on the terminal body portion. The terminal insulating film is made of the same material as that of the electrode insulating film. The terminal insulating film is formed so as to cover the planarizing film and to open at the opening. The terminal electrode portion is made of the same material as that of the second electrode. The terminal electrode portion is electrically connected to the terminal body portion through the opening.

With this configuration, in an FFS mode liquid crystal device having a planarizing film, because the electrode insulating film provided between the first electrode and the second electrode is arranged in the terminal region (the region in which the planarizing film is not formed) as the terminal insulating film, the terminal insulating film serves as a passivation film for the terminal. Furthermore, because the terminal body portion is made of the same material as that of the signal wiring, they may be formed at the same time, and it is possible to simplify a connection between the terminal and the signal wiring. In addition, because the side face of the terminal body portion is covered with the terminal insulating film, the planarizing film and the terminal, it is possible to ensure further high anti-corrosion.

In addition, the liquid crystal device according to the aspects of the invention may be configured so that the mounting component is connected through the terminal. Furthermore, a sixth aspect of the invention provides an electronic apparatus having the liquid crystal device according to the above aspects of the invention. Thus, it is possible to achieve an electronic apparatus that is provided with a liquid crystal display portion of a terminal structure having high anti-corrosion and good electrical conduction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanying drawings.

First Embodiment

A liquid crystal device according to a first embodiment of the invention will now be described with reference to FIG. 1 to FIG. 5I. The liquid crystal device according to the first embodiment is of an active matrix type that uses an LTPS (low-temperature polysilicon) TFT element as a pixel switching element. The liquid crystal device is an example of an FFS mode transmissive liquid crystal device.

Figure 1:
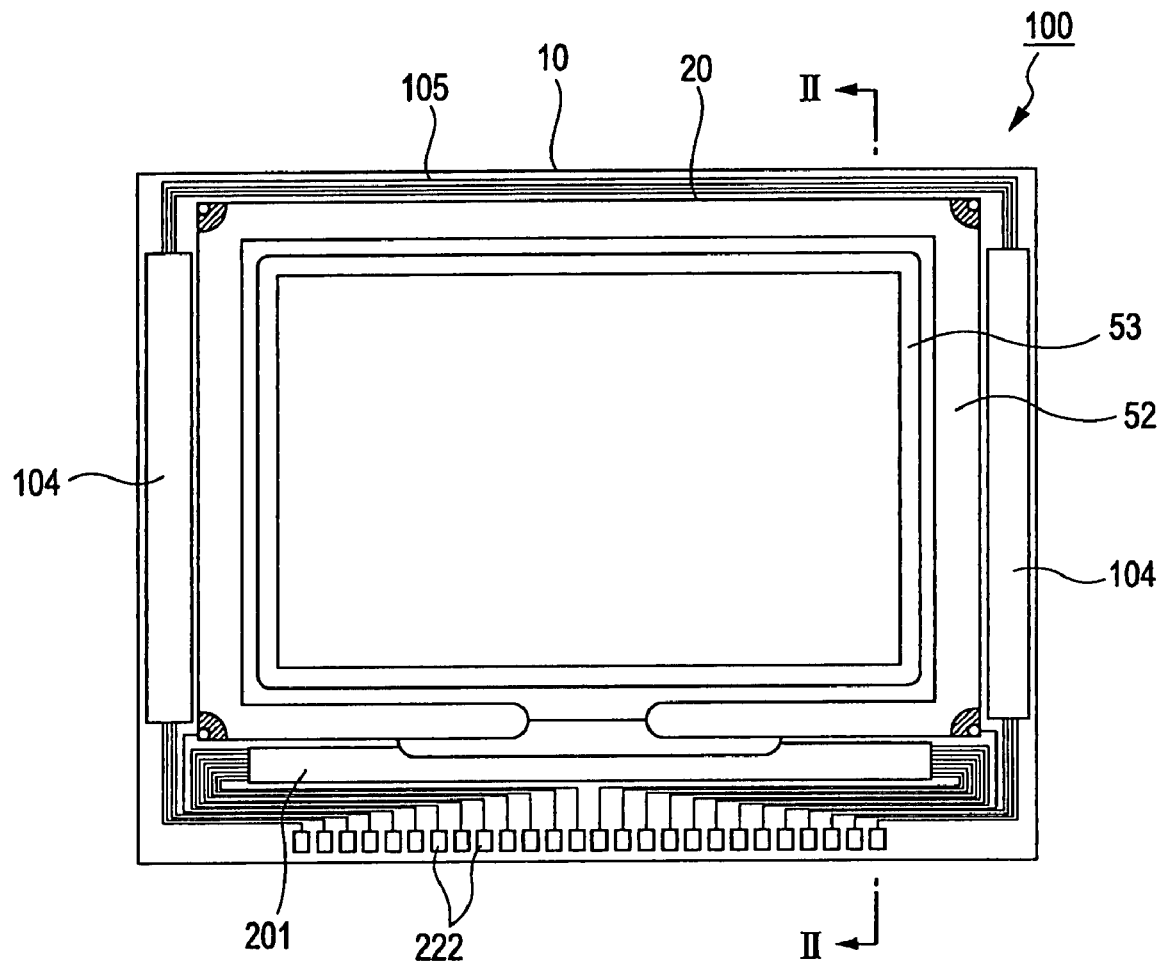
FIG. 1 is a schematic plan view of a liquid crystal device according to a first embodiment of the invention.
Figure 2:
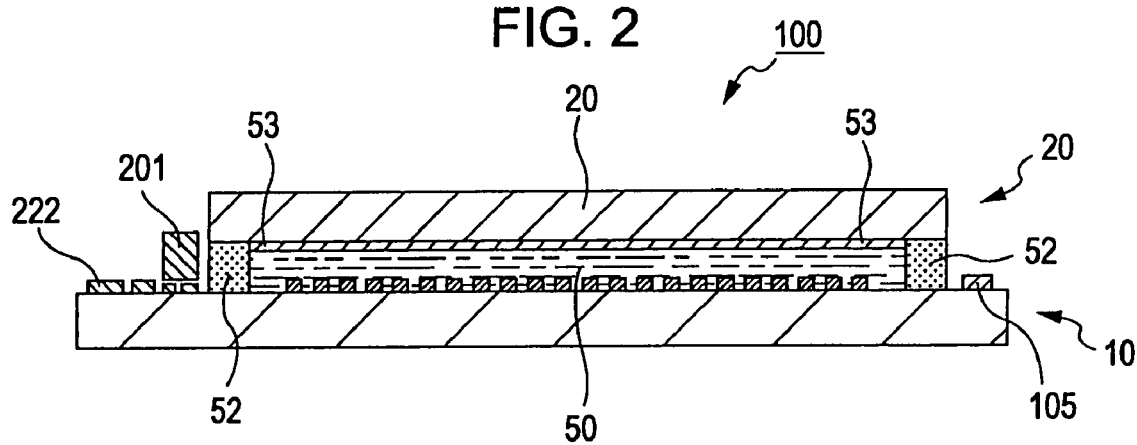
FIG. 2 is a cross-sectional view of the liquid crystal device.
Figure 3A:
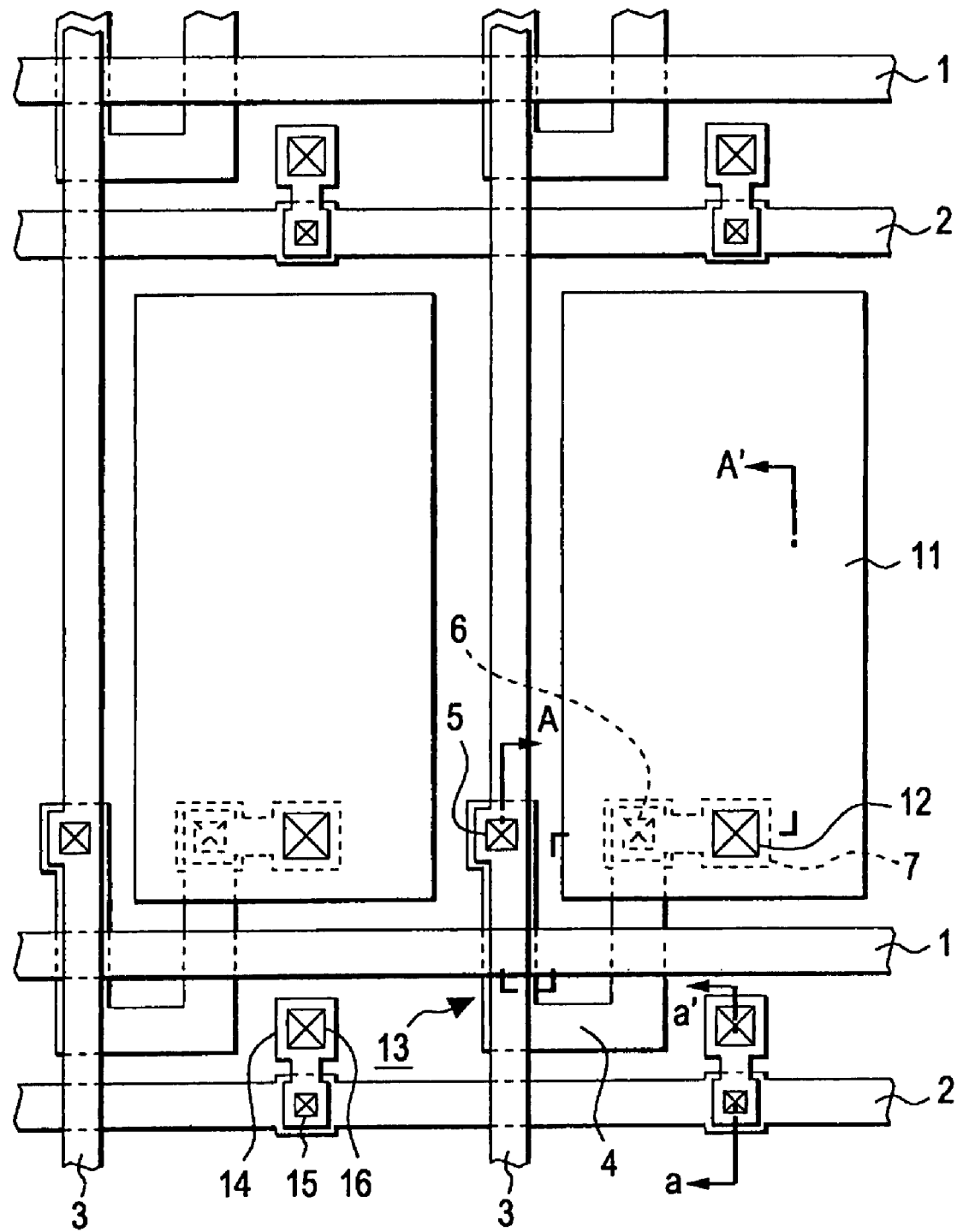
FIG. 3A is an enlarged plan view of pixels in the liquid crystal device.
Figure 3B:
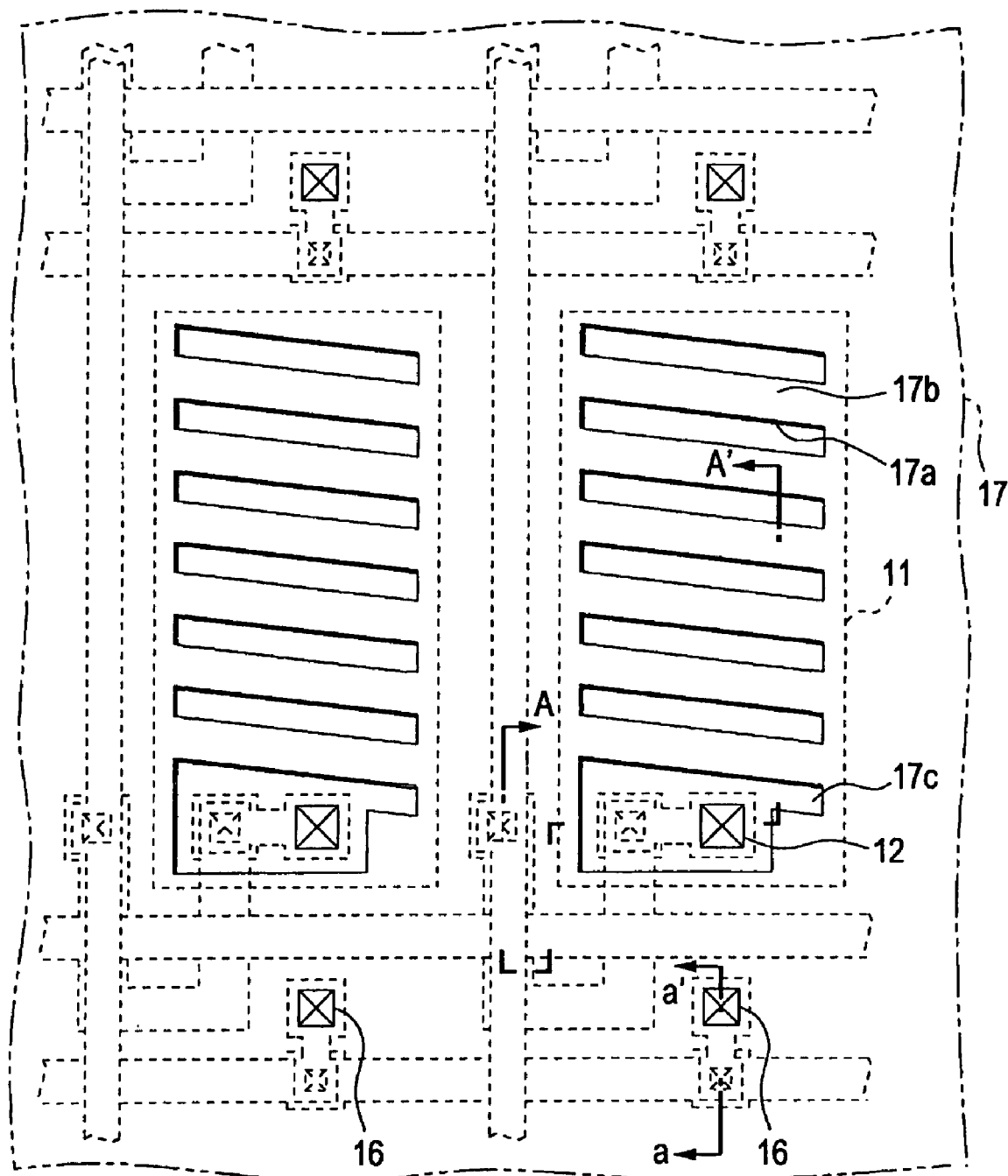
FIG. 3B is an enlarged plan view of the pixels in the liquid crystal device.
Figure 4:
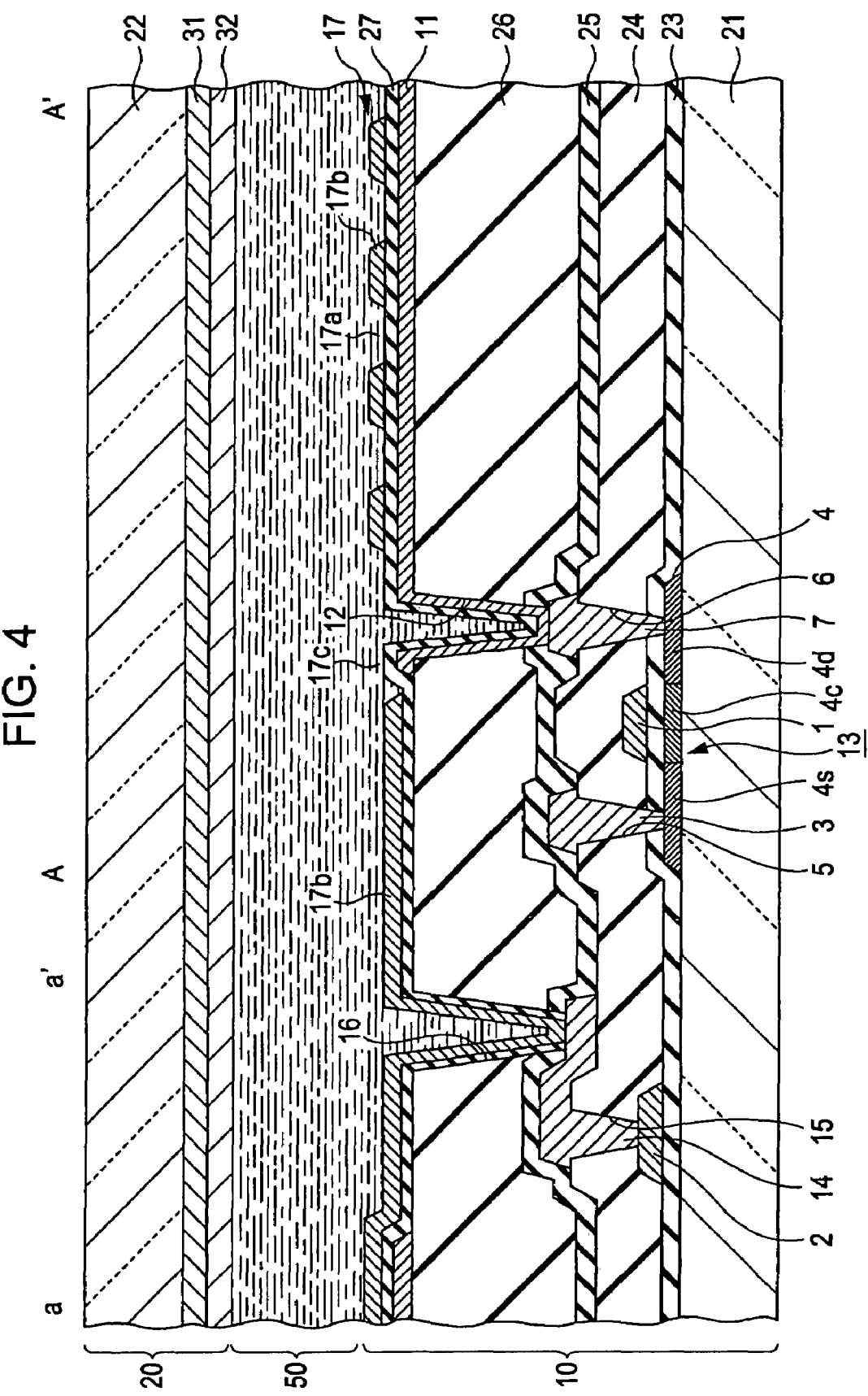
FIG. 4 is a cross-sectional view of the pixel in the liquid crystal device.

FIG. 1 is a plan view of a liquid crystal device with component elements according to the present embodiment as viewed from the side of an opposite substrate. FIG. 2 is a cross-sectional view that is taken along the line II-II in FIG. 1. FIG. 3A and FIG. 3B are enlarged plan views of pixels on an element substrate of the liquid crystal device. FIG. 4 is a cross-sectional view of the liquid crystal device, taken along the line A-A' and line a-a' in FIG. 3A or FIG. 3B. FIG. 5A to FIG. 5I are cross-sectional views showing a process of manufacturing the liquid crystal device. Note that, in the drawings used for description, in order to easily recognize layers and members in the drawings, the scales are modified among the layers and members.

As shown in FIG. 1 and FIG. 2, a liquid crystal device 100 according to the first embodiment is formed so that a TFT array substrate 10 (first substrate) and an opposite substrate 20 (second substrate) are stuck to each other through a seal material 52, a liquid crystal layer 50 is encapsulated in a space that is defined by the seal material 52. The liquid crystal layer 50 is formed of liquid crystal that has a characteristic of positive anisotropy of dielectric constant. A light blocking film (peripheral shield) 53 made of light blocking material is formed in a space inside the region where the seal material 52 is formed. In the region outside the seal material 52 and along one of the sides of the TFT array substrate 10, an IC chip, which is a data line driving circuit 201, is mounted by means of COG technology, and a plurality of input terminals 222 are provided outside the above region for connection with a flexible substrate. In addition, IC chips, which serve as scanning line driving circuits 104, are formed respectively along two sides adjacent to the region where the data line driving circuit 201 is mounted. At the remaining one side of the TFT array substrate 10, a plurality of wirings 105 are provided to connect both of the scanning line driving circuits 104 that are provided at both sides around a display area.

A plurality of pixels are arranged in a matrix in the display area of the liquid crystal device 100.

FIG. 3A and FIG. 3B are plan views showing a relevant configuration of pixels provided in the TFT array substrate 10. As will be described later, in the liquid crystal device 100 according to the present embodiment, transparent pixel electrodes 11 and a common electrode 17 are laminated through an insulating film. Therefore, it becomes difficult to recognize the configuration of electrodes when illustrated as it is. For this reason, the pixel electrodes 11 and their lower layer wiring configuration are shown in FIG. 3A, and the configuration of the common electrode 17 is shown in FIG. 3B. As shown in these drawings, scanning lines 1 and common lines 2 extend in a horizontal direction (in a lateral direction in FIG. 3A or FIG. 3B), the data lines 3 extend in a vertical direction (in a longitudinal direction in FIG. 3A or FIG. 3B), and each region, which is surrounded by the scanning line 1, the common line 2 and the data line 3, forms one pixel region. Semiconductor layers 4 made of polycrystalline silicon film each are formed in a substantially U-shape at a position adjacent to an intersection of the data line 3 and the scanning line 1. Contact holes 5, 6 are formed at both ends of each semiconductor layer 4. One contact hole 5 is a source contact hole that electrically connects a source region 4s of the semiconductor layer 4 to the corresponding data line 3, and the other contact hole 6 is a drain contact hole that electrically connects a drain region 4d of the semiconductor layer 4 to a corresponding drain electrode 7. In the drain electrode 7, a pixel contact hole 12 is formed at the end opposite to the end where the contact hole 6 is provided. The pixel contact hole 12 is electrically connected to the pixel electrode 11, which will be described later.

In the TFT 13 of the present embodiment, the substantially U-shaped semiconductor layer 4 intersects with the scanning line 1, and the semiconductor layer 4 and the scanning line 1 intersect with each other at two portions, so that the TFT 13 is a so-called dual gate type TFT that has two gates in one semiconductor layer. Note that, although the TFT 13 is a dual gate type TFT in FIG. 3A and FIG. 3B, a cross-sectional structure shown in FIG. 4, which will be described layer, seems like a single gate type TFT. However, this is due to the path of the broken line II-II shown in FIG. 3A and FIG. 3B.

Each of the pixel electrodes 11 (first electrode) is, for example, formed of material, such as indium tin oxide (hereinafter, referred to as ITO). As shown in FIG. 3A, the pixel electrode 11 is patterned in a substantially rectangular shape at a position corresponding to one pixel region. On the other hand, the common electrode 17 (second electrode) is also, for example, formed of material, such as ITO. As shown in FIG. 3B, the common electrode 17 is formed over the entire display area where the plurality of pixels are arranged in a matrix. In addition, the common electrode 17 has slit-like openings 17a at portions that overlap the corresponding pixel electrode 11. Thus, strip-shaped electrode portions 17b are formed between the adjacent openings 17a. Note that the common electrode 17 is provided with an opening 17c so as to leave the contact holes 6, 12 that are not covered with the common electrode 17. Then, the common electrode 17 and each common line 2 are connected through a connection electrode 14 that is made of the same material as that of the data line 3. A connection contact hole 15 is formed to electrically connect the common line 2 to one end of the connection electrode 14. A common contact hole 16 is formed to electrically connect the other end of the connection electrode 14 to the common electrode 17.

Here, the common lines 2 are provided to decrease a time constant of the common electrode 17 made of ITO, or the like. Thus, when the time constant of the common electrode 17 is sufficiently low, these common lines 2 may be omitted. In addition, in the drawing, the rectangular pixel electrodes 11 are positioned in the lower layer side than the common electrode 17. However, the pixel electrodes 11 may be positioned in the upper layer side than the common electrode 17. When the pixel electrode 11 is positioned in the upper layer side than the common electrode 17, the slit-shaped openings 17a are formed not in the common electrode 17 but in the pixel electrodes 11. In any event, the slit-like openings are provided in the upper side layer, that is, on the side adjacent to the liquid crystal layer 50, between two layers of ITO electrodes. Note that, in the following description, as shown in FIG. 3A and FIG. 3B, a description will be made with an example when the pixel electrodes 11 are positioned in the lower layer side than the common electrode 17.

A cross-sectional structure of the liquid crystal device 100 will be described with reference to FIG. 4. The TFT array substrate 10 (the lower substrate in FIG. 4) and the opposite substrate 20 (the upper substrate in FIG. 4) are transparent like glass. As shown in FIG. 4, the liquid crystal layer 50 is held between both of the substrates. The semiconductor layer 4 made of polycrystalline silicon is formed on a transparent substrate 21, which serves as a base material of the TFT array substrate 10. A gate insulating film 23 made of silicon oxide film is formed so as to cover the semiconductor layer 4 and the transparent substrate 21. The semiconductor layer 4 forms the TFT 13 that controls switching of the corresponding pixel electrode 11. The semiconductor layer 4 includes a channel region 4c of the semiconductor layer 4, in which a channel is formed owing to an electric field from a gate electrode, a source region 4s and a drain region 4d. The gate electrode is the scanning line 1 made of molybdenum and is electrically insulated from the semiconductor layer 4 by a gate insulating film 23. Note that the common line 2 is formed in the same layer as that of the gate electrode in the TFT 13 and simultaneously formed when the gate electrode is patterned.

A first interlayer insulating film 24 made of silicon oxide film is provided on the TFT 13 and the common line 2, and the source contact hole 5 for connection with the source region 4s, the drain contact hole 6 for connection with the drain region 4d and the connection contact hole 15 for connection with the common line 2 are formed in the first interlayer insulating film 24. The data line 3 is electrically connected to the source region 4s of the semiconductor layer 4 through the source contact hole 5 that extends through the first interlayer insulating film 24. The drain electrode 7 is electrically connected to the drain region 4d of the semiconductor layer 4 through the drain contact hole 6 that extends through the first interlayer insulating film 24. In addition, one end of the connection electrode 14 is connected to the common line 2 through the connection contact hole 15 that extends through the first interlayer insulating film 24. Here, the drain electrode 7 and the connection electrode 14 are formed in the same layer as that of the data line 3 and formed on the first interlayer insulating film 24 using material such as aluminum. Furthermore, a second interlayer insulating film 25 and a third interlayer insulating film 26 are sequentially laminated. The second interlayer insulating film 25 is formed of silicon nitride (SiN) film, or the like, and provided to protect particularly an aluminum surface, such as the data line 3, the drain electrode 7 and the connection electrode 14. Moreover, the third interlayer insulating film 26 is formed of acrylic resin and provided to planarize unevenness of the lower layer. Note that the second interlayer insulating film 25 and the third interlayer insulating film 26 are provided with a pixel contact hole 12 for connection with the drain electrode 7 and a common contact hole 16 for connection with the other end of the connection electrode 4.

The pixel electrode 11 for which a transparent conductive film such as ITO is patterned into a substantially rectangular shape is formed on the third interlayer insulating film 26. Therefore, the pixel electrode 11 is electrically connected to the drain region 4d of the semiconductor layer 4 through the drain electrode 7 as an intermediate layer. A fourth interlayer insulating film 27 made of silicon nitride film is formed on the third interlayer insulating film 26 and the pixel electrode 11. Note that the fourth interlayer insulating film 27 is perforated at the common contact hole 16. The common electrode 17 having slit-like openings 17a, 17c is formed on the fourth interlayer insulating film 27 by patterning a transparent conductive film such as ITO. Note that the common electrode 17, in the display area, is solid almost over the entire surface other than the openings 17a, 17c. Note that, although an alignment layer made of polyimide, or the like, is actually formed on a surface that is an uppermost layer of the TFT array substrate 10 and in contact with the liquid crystal layer 50, it is omitted from the drawing.

On the other hand, in the opposite substrate 20, any one of color material layers 31 among red (R), green (G), blue (B) that form a color filter is formed on a transparent substrate 22 in each of the pixels. In addition, an overcoat 32 is formed so as to protect the color material layer 31 and to planarize unevenness due to the color material layer 31. Furthermore, although the same alignment layer as that formed in the TFT array substrate 10 is provided on the overcoat layer 32 (lower side in FIG. 4), the alignment layer is omitted from the drawing. Process of Manufacturing TFT, etc.

Figure 5A:
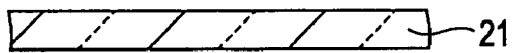
FIG. 5A to FIG. 5I are views showing a process of manufacturing an TFT in the liquid crystal device.
Figure 5B:
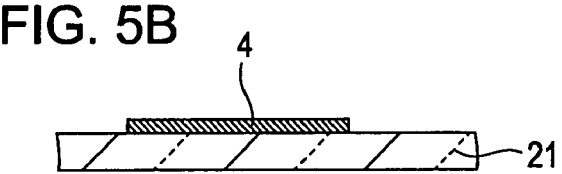

Of the configuration of the liquid crystal device 100, a process of manufacturing portions around the TFT 13 in the TFT array substrate 10 will be specifically described with reference to FIG. 5A to FIG. 5I. At first, as shown in FIG. 5A, the transparent substrate 21 made of glass, crystal, or the like, is prepared. An amorphous silicon film having a thickness of about 40 nm is deposited on the transparent substrate 21 through CVD process. The deposited amorphous silicon film is then treated with laser annealing to be recrystallized, thus forming a polycrystalline silicon film. After that, the polycrystalline silicon film is patterned through known photolithography process or etching process to form the semiconductor layer 4. In this manner, a state shown in FIG. 5B is obtained.

Figure 5C:
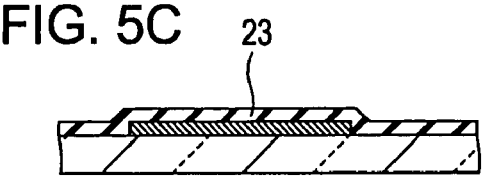
Figure 5D:
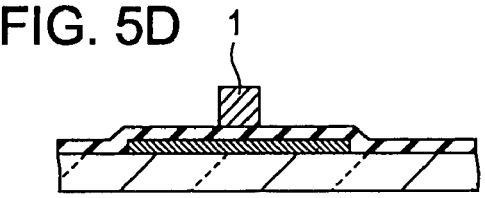

Then, as shown in FIG. 5C, a silicon oxide film having a thickness of about 75 nm is deposited over the entire surface of the substrate through sputtering process, CVD process, or the like, to form the gate insulating film 23. Subsequently, a molybdenum film having a thickness of about 300 nm is deposited over the entire surface of the substrate on the gate insulating film 23 through sputtering process, or the like, and the molybdenum film is then patterned through known photolithography process or etching process to form the scanning line 1. In this manner, a state shown in FIG. 5D is obtained. Note that, when the molybdenum film is patterned, the common line 2, which is omitted from the drawing, is also formed together with the scanning line 1.

Figure 5E:
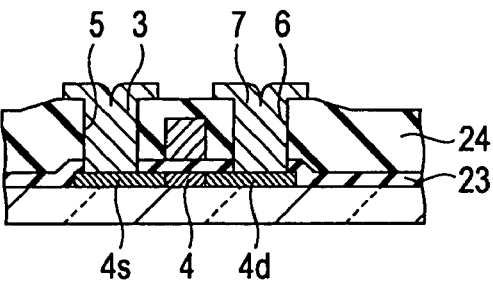
Figure 5F:
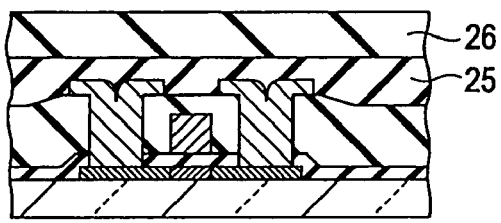

A silicon oxide film is then deposited on the entire surface of the substrate through CVD process, or the like, to form the first interlayer insulating film 24. Thereafter, the first interlayer insulating film 24, the source contact hole 5 that extends through the gate insulating film 23 to the source region 4s of the semiconductor layer 4, the drain contact hole 6 that extends through the gate insulating film 23 to the drain region 4d of the semiconductor layer 4 are formed through known photolithography process or etching process. Then, the connection contact hole 15, which is omitted from the drawing in FIG. 5A to FIG. 5I, that extends to the common line 2 is also formed at the same time. After that, an aluminum film having a thickness of about 500 nm is deposited over the entire surface of the substrate through sputtering process, or the like, and the aluminum film is then patterned through known photolithography process or etching process to form the data line 3 and the drain electrode 7. Thus, a state shown in FIG. 5E is obtained. Note that, when the aluminum film is patterned, the connection electrode 14, which is omitted from the drawing, is also formed together with the data line 3 and the drain electrode 7. Next, as shown in FIG. 5F, a silicon nitride film is deposited over the entire surface of the substrate through CVD process, or the like, to form the second interlayer insulating film 25. Subsequently, an acrylic resin film having a thickness of about 1 to 3 μm is applied over the entire surface of the substrate and then cured to form the third interlayer insulating film 26.

Figure 5G:
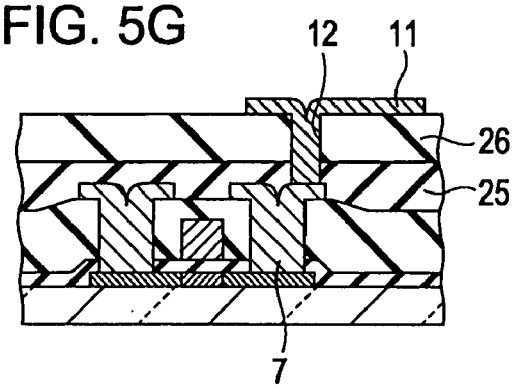

Furthermore, the pixel contact hole 12 that extends through the third interlayer insulating film 26 and the second interlayer insulating film 25 to the drain electrode 7 is formed through known photolithography process or etching process. Then, the common contact hole 16, which is omitted from the drawing in FIG. 5A to FIG. 5I, that extends to the connection electrode 14 is also formed at the same time. Thereafter, an ITO film having a thickness of about 75 nm is deposited over the entire surface of the substrate through sputtering process, or the like, and the ITO film is then patterned through known photolithography process or etching process to form the pixel electrode 11. In this manner, a state shown in FIG. 5G is obtained.

Figure 5H:
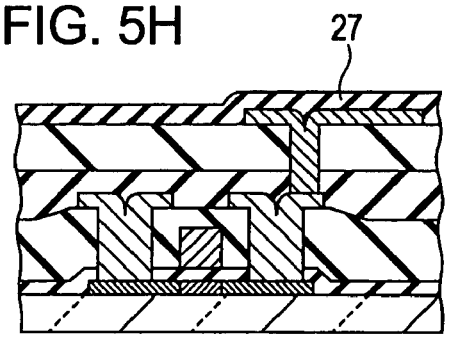
Figure 5I:
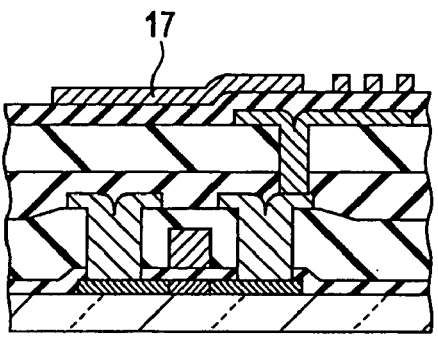

Now, as shown in FIG. 5H, a silicon nitride film having a thickness of about 50 to 400 nm is deposited over the entire surface of the substrate through sputtering process, CVD process, or the like to form the fourth interlayer insulating film 27. After that, portion of the fourth interlayer insulating film 27 that covers the connection electrode 14 in the common contact hole 16, which is omitted from FIG. 5A to FIG. 5I, is removed, and an ITO film having a thickness of about 75 nm is deposited over the entire surface of the substrate through sputtering process. The ITO film is then patterned through known photolithography process or etching process to form the common electrode 17 having the openings 17a, 17c. In this manner, a state shown in FIG. 5I is obtained. Note that, although not specifically illustrated in the drawing, a polyimide film is thereafter deposited over the entire surface of the substrate and a rubbing process is then performed to form the alignment layer. Through the above process, of the TFT array substrate 10, a portion corresponding to the display area is formed.

Terminal in the First Embodiment

The input terminals 222 formed outside the display area in the TFT array substrate 10 and terminals connected to the scanning line driving circuits 104 and data line driving circuit 201 are simultaneously formed together with the above described display area. Here, the terminals connected to the scanning line driving circuits 104 include terminals connected to the input terminals 222 to be supplied with clock signals or control signals from an external control circuit through an FPC substrate and terminals connected to the scanning lines 1. Similarly, the terminals connected to the data line driving circuit 201 include terminals connected to the input terminals 222 to be supplied with control signals or display data from the external control circuit and terminals connected to the data lines 3. In the present embodiment, the terminals connected to the scanning line driving circuits 104 and the data line driving circuit 201 basically have the same structure as those of the input terminals 222 connected to the external control circuit through the FPC substrate. Here, the structure of a terminal 202 will be described with reference to FIG. 6 to FIG. 8.

Figure 6:
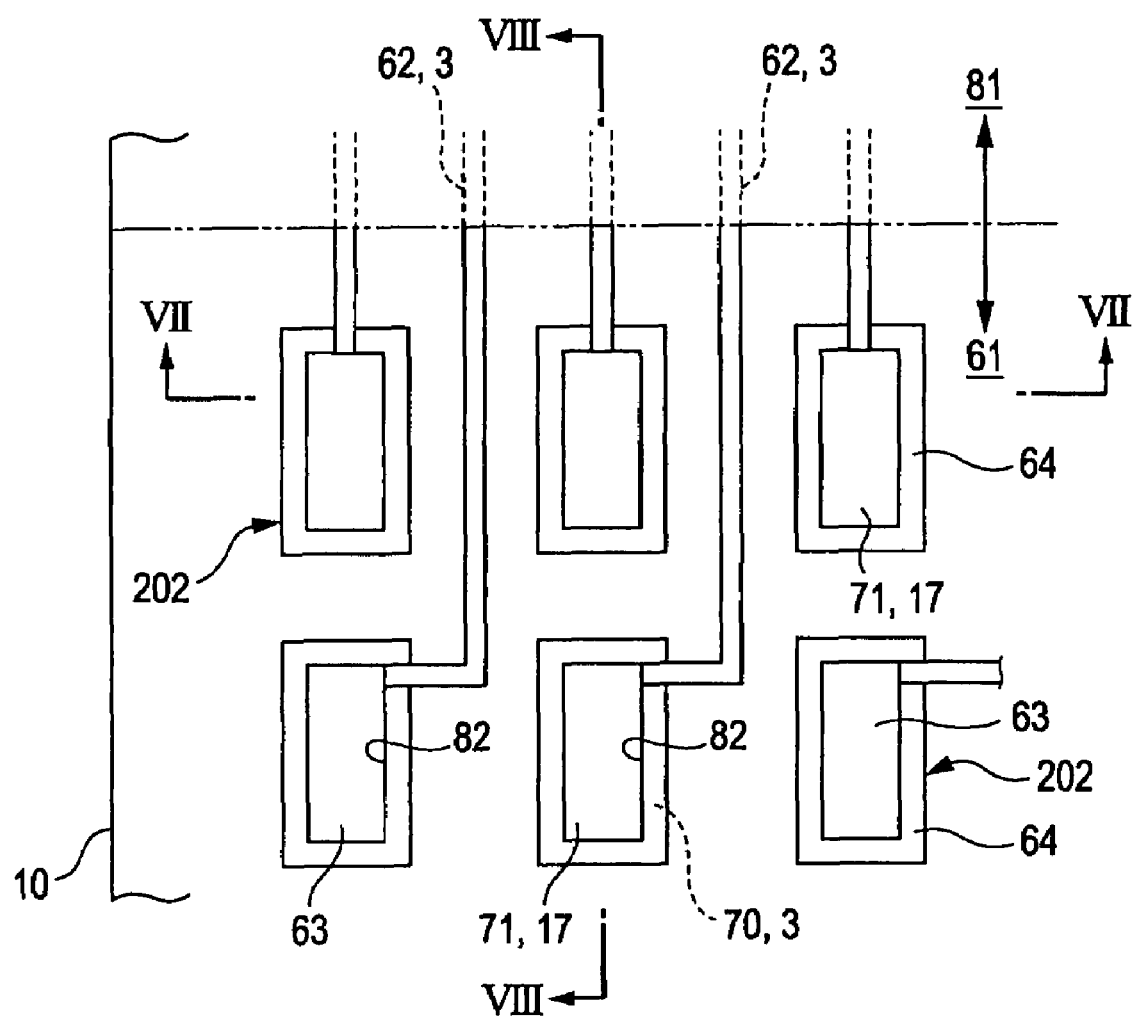
FIG. 6 is an enlarged plan view of portions around terminals in the liquid crystal device.
Figure 7:
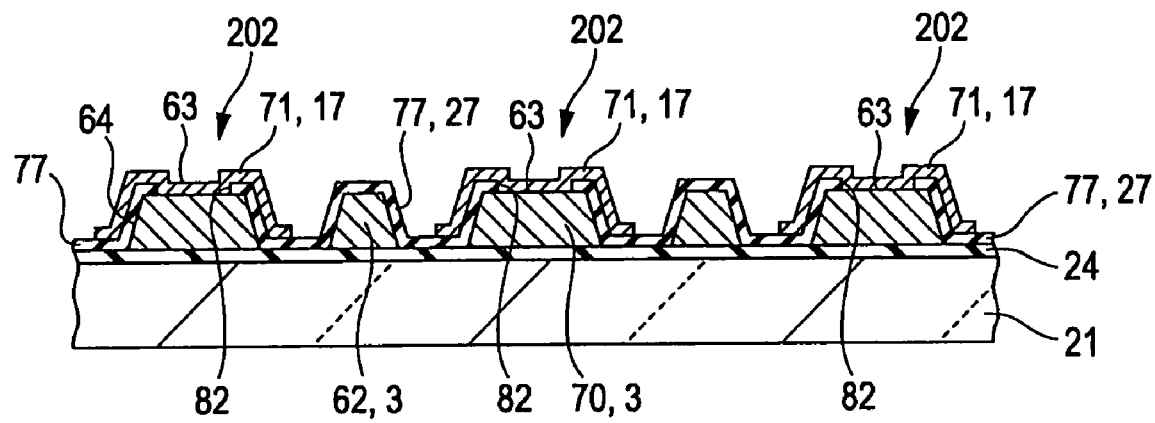
FIG. 7 is a cross-sectional view that is taken along the line VII-VII in FIG. 6.
Figure 8:
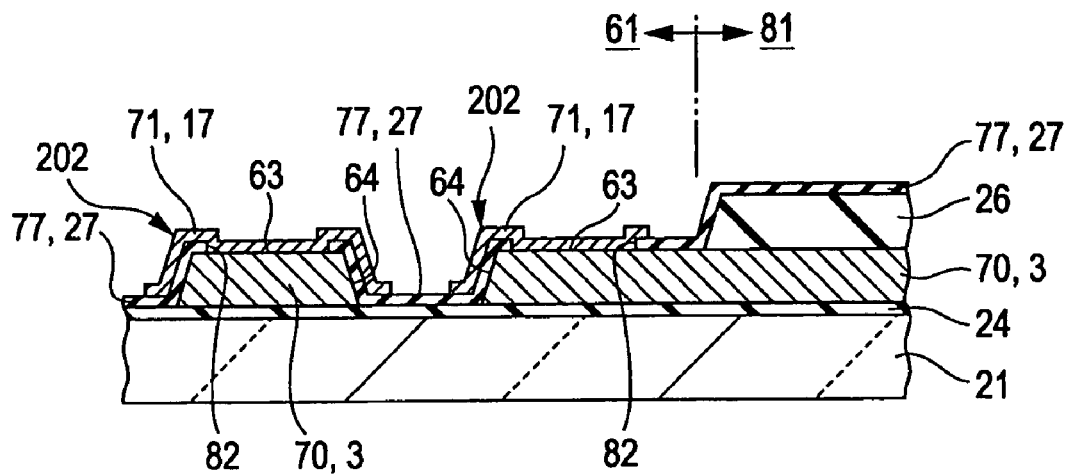
FIG. 8 is a cross-sectional view that is taken along the line VIII-VIII in FIG. 6.

FIG. 6 is an enlarged plan view of a region in which terminals are formed. FIG. 7 is a cross-sectional view that is taken along the line VII-VII in FIG. 6. FIG. 8 is a cross-sectional view that is taken along the line VIII-VIII in FIG. 6. Note that FIG. 6 to FIG. 8 are views showing a state in which mounting components such as the scanning line driving circuits 104, the data line driving circuit 201, the FPC substrate are omitted. As shown in these drawings, the plurality of terminals 202 are arranged in a region 61. On the upper surface of the terminals 202, terminal connections 63 for connection with the mounting components are formed in a substantially rectangular shape. In a region 81 that is positioned closer to the display area than the region 61, the third interlayer insulating film 26 as a planarizing film is left. However, in the region 61, the third interlayer insulating film 26 is selectively removed.

Wirings 62 are formed with the same film as the aluminum film that forms the data lines 3 (the drain electrodes 7 and the connection electrodes 14) in the display area and electrically connected to the scanning lines 1, the common lines 2 or the data lines 3. Note that, when the wirings 62 are connected to the data lines 3, the wirings 62 become the data lines 3 themselves. Each of the wirings 62 projects from the end of the display area out of the lower layer of the third interlayer insulating film 26 into the region 61 and becomes a terminal body portion 70 in the terminal 202. Terminal insulating films 77 are formed on the upper surface of the terminal body portions 70 and the first interlayer insulating film 24. The terminal insulating films 77 are the fourth interlayer insulating film 27 in the display area and open at the openings 82 formed on the terminal body portions 70 in a substantially rectangular shape. Terminal electrode portions 71 are formed in a rectangular shape to cover the terminal body portions 70 and the openings 82 in the terminal insulating film 77 formed on the upper surface of the terminal body portions 70. The terminal electrode portions 71 are formed in the same layer as that of the common electrode 17 in the display area when the common electrode 17 is patterned and connected to the terminal body portions 70 at the openings 82 to form terminal connections 63. Therefore, in the region 61, the terminal portions of the aluminum portions of the wirings 62 and terminal body portions 70 are covered with both the terminal insulating films 77 and the terminal electrode portions 71, and the other portions are covered with the terminal insulating film 77.

Process of Manufacturing Terminals

FIG. 9A to FIG. 9E are cross-sectional views, taken along the line VII-VII in FIG. 6, showing a process of manufacturing the region 61. Note that, as described above, the terminals 202 are formed at the same time with the display area in the TFT array substrate 10, so that a description will be made in combination with reference to FIG. 5A to FIG. 5I depending on a situation.

Figure 9A:
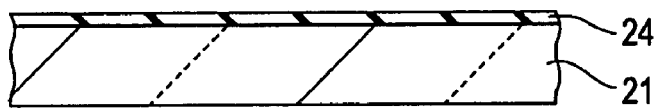
FIG. 9A to FIG. 9E are cross-sectional views showing a process of manufacturing portions around terminals in the liquid crystal device.
Figure 9B:
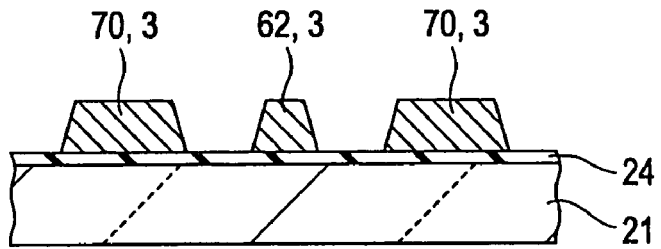

The region 61 where the terminals 202 are formed is initially formed through a process shown in FIG. 5E. Thus, the gate insulating film 23 is not formed in the region 61. At first, the first interlayer insulating film 24 is deposited over the entire surface of the transparent substrate 21 (FIG. 9A, first process). Then, when the data lines 3, the drain electrodes 7 and the connection electrodes 14 shown in FIG. 5E are formed, an aluminum film is deposited in the region 61 as well, and the aluminum film is patterned to form the wirings 62, the terminal body portions 70 (FIG. 9B, second process). Note that, after this process, the second interlayer insulating film 25, the third interlayer insulating film 26 and the pixel electrodes 11 are formed in the display area; however, in the present embodiment, these films are not provided in the region 61.

Figure 9C:
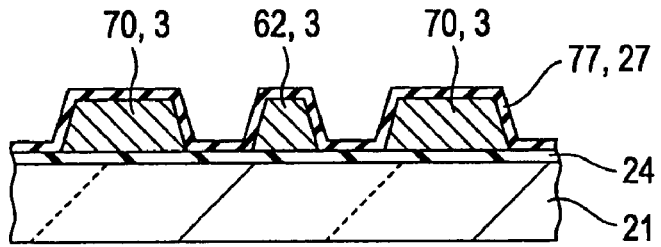
Figure 9D:
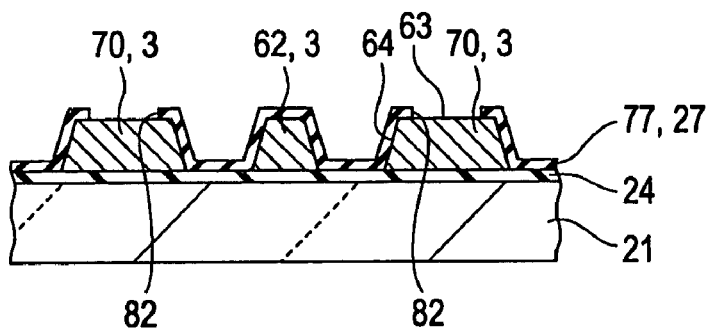
Figure 9E:
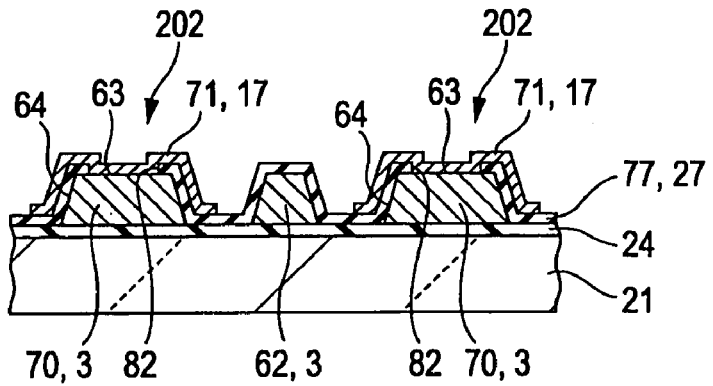

Subsequently, when the fourth interlayer insulating film 27 shown in FIG. 5H is formed, a silicon nitride film is deposited in the region 61 as well to form the terminal insulating film 77 (FIG. 9C, third process). Further, the terminal insulating film 77 is patterned through known photolithography process or etching process to open at the openings 82 that will be the terminal connections 63 (FIG. 9D, fourth process). When the common electrode 17 (second electrode) shown in FIG. 5I is formed, an ITO film is deposited in the region 61, the ITO film is patterned to form the terminal electrode portions 71 so as to cover the openings 82 and the side portions 64 of the terminal body portions 70 (FIG. 9E, fifth process).

Here, as to layers that are formed in the process of manufacturing shown in FIG. 5A to FIG. 5I but not formed in the process of forming terminals shown in FIG. 9A to FIG. 9E (for example, the second interlayer insulating film 25, the third interlayer insulating film 26, the pixel electrodes 11, and the like), in the process of forming the layers, a region used for the region 61 is covered with a mask so as not to form the layers or the layers are removed after being formed over the entire surface in the region 61 so as not to form the layers in the region 61.

When the terminals 202 are thus configured, it is possible to use the terminal insulating film 77, which is formed at the same time with the fourth interlayer insulating film 27 provided between the pixel electrodes 11 and the common electrode 17 as a passivation film for the terminal body portions 70 (the wirings 62, the data lines 3). In addition, the terminal body portions 70 are formed at the same time with the data lines 3, so that portions that extend from the terminals 202 through the wirings 62 to the data lines 3 are integrated.

On the other hand, when a planarizing film (the third interlayer insulating film 26) is formed in the region 61, a through-hole needs to be formed in the thick planarizing film. Thus, it is likely for the terminal body portions 70 positioned at the bottom of the deep through-hole to be poorly connected. Furthermore, when the through-hole is deep, a conductive film for forming a pad is poorly adhered. As a result, there is a possibility that it is impossible to reliably ensure good electrical conduction. Then, in the present embodiment, the third interlayer insulating film 26, which is formed as the planarizing film in the display area, is removed (or not formed) in the region 61. Thus, unevenness in the region 61 is reduced, so that it is possible to ensure good electrical conduction in the terminal connections 63.

In addition, by covering the side portions 64 of the terminal body portions 70 with the terminal insulating film 77 and the terminal electrode portions 71, it is possible to protect the terminal body portions 70. Thus, it is possible to ensure high anti-corrosion of the terminals 202. In particular, since the terminal insulating film 77 serves as a passivation film, it is possible to prevent the terminal body portions 70 from being eroded by etchant that is used when the terminal electrode portions 71 (the common electrode 17) are formed by etching process.

Furthermore, since the terminals 202 project from the substrate surface in the region 61, when the terminals 202 are connected to the mounting components through ACF or ACP, the distances between the terminal connections 63 and the terminals of the mounting components are smaller than the distances between the substrate surface and the terminals of the mounting components. Thus, the connection by anisotropic conductive particles is reliable.

Figure 10:
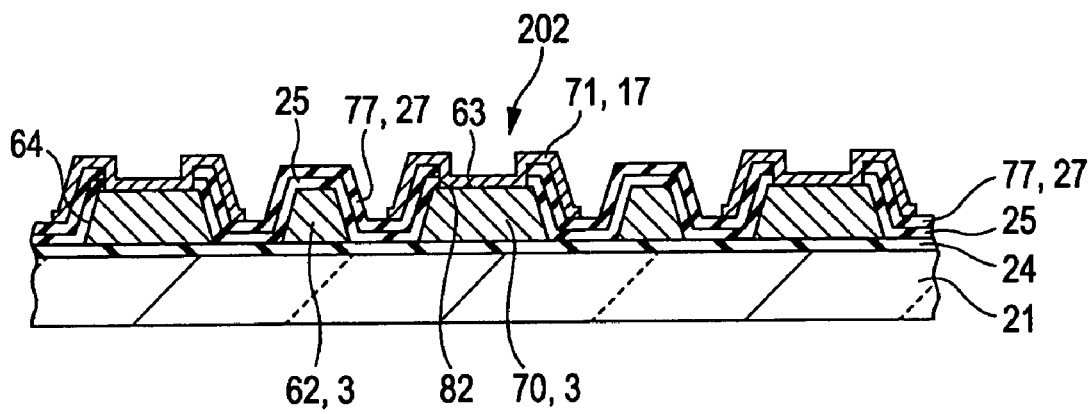
FIG. 10 is a cross-sectional view that is taken along the line VII-VII in FIG. 6, showing the configuration of other terminals in the liquid crystal device.
Figure 11:
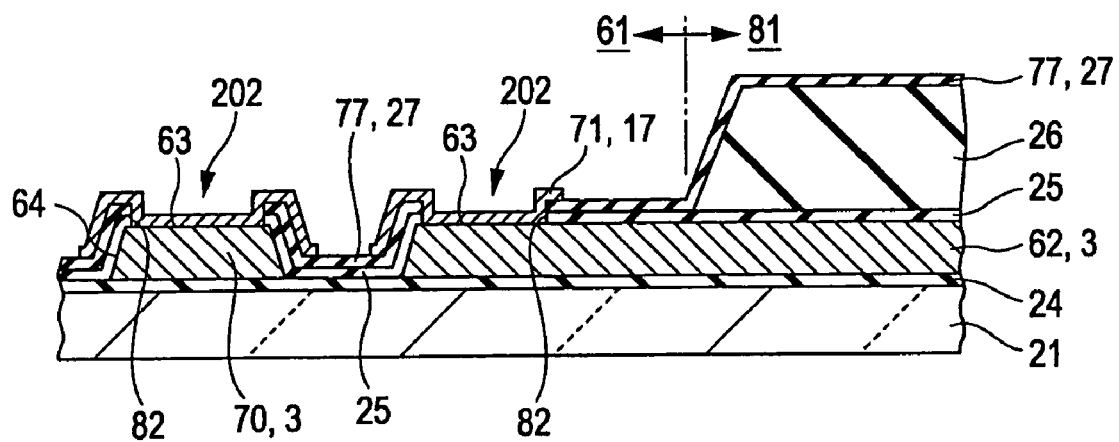
FIG. 11 is a cross-sectional view that is taken along the line VIII-VIII in FIG. 6, showing the configuration of other terminals in the liquid crystal device.

Note that, in the present embodiment, the second interlayer insulating film 25 is not used in the region 61; however, the second interlayer insulating film 25 may be formed so as to extend into the region 61. FIG. 10 is a cross-sectional view that is taken along the line VII-VII in FIG. 6 when the second interlayer insulating film 25 is formed so as to extend into the region 61. FIG. 11 is a cross-sectional view that is taken along the line VIII-VIII in FIG. 6 in the above case. Such a configuration may be formed so that, before the second process shown in FIG. 9B and after the first process shown in FIG. 9A, a silicon nitride film is also deposited in the region 61 when the second interlayer insulating film 25 is formed as shown in FIG. 5F, and, when the openings 82 are provided in the fourth process shown in FIG. 9D, the second interlayer insulating film 25 and the terminal insulating film 77 are opened to form the openings 82. With this configuration, since the passivation film for the terminal body portions 70 (the wirings 62) has a two-layer structure that includes the second interlayer insulating film 25 in addition to the fourth interlayer insulating film 27, which is the terminal insulating film 77. Thus, it is possible to effectively prevent corrosion of the terminal body portions 70.

Second Embodiment

A liquid crystal device according to a second embodiment of the invention will now be described. Note that, in the liquid crystal device according to the second embodiment and other following embodiments, the configurations in the display areas are the same as that of the first embodiment but the terminals 202 formed in the region outside the display area differ from those of the first embodiment. Therefore, the liquid crystal devices according to the second embodiment and the other following embodiments will be described by focusing on a process of manufacturing the terminals 202 and the structure thereof. The liquid crystal device according to the second embodiment, in short, has a configuration that the terminal body portions 70 and the side portions 64 are covered with an ITO film formed in the same layer of the pixel electrodes together with the terminal insulating film 77 and the terminal electrode portions 71 formed in the same layer of the common electrode. That is, in the second embodiment, the terminal connections 63 and the side portions 64 are covered with two layers of ITO film.

Figure 12A:
FIG. 12A to FIG. 12F are cross-sectional views showing a process of manufacturing portions around terminals of the liquid crystal device according to a second embodiment.
Figure 12B:
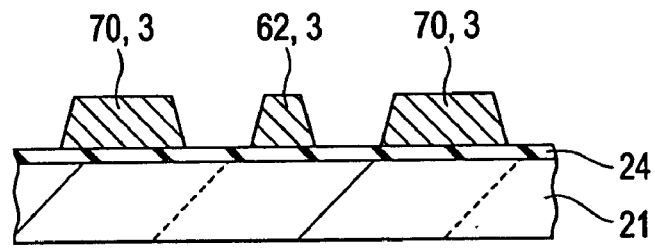
Figure 12C:
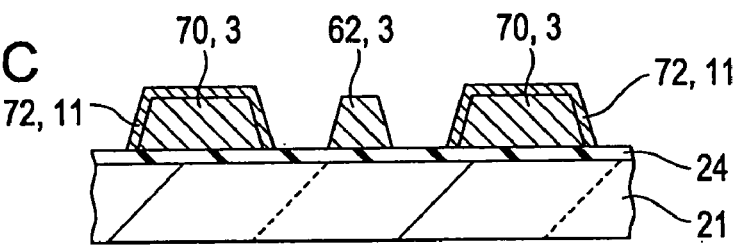
Figure 12D:
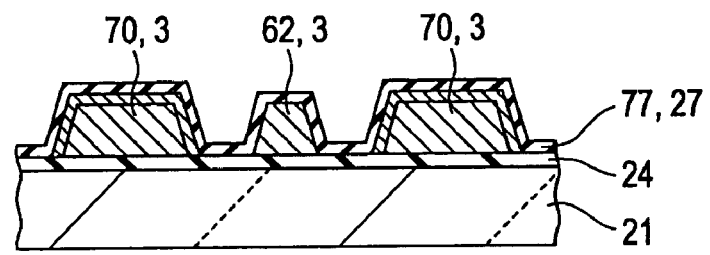
Figure 12E:
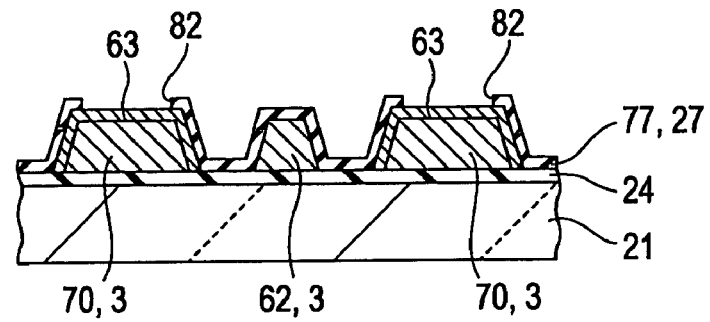
Figure 12F:
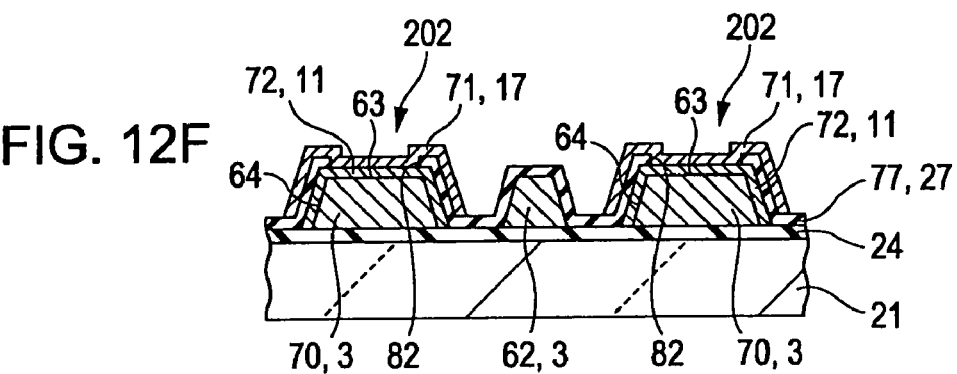

FIG. 12A to FIG. 12F are cross-sectional views, taken along the line VII-VII in FIG. 6, showing a process of manufacturing the region 61 in the TFT array substrate 10 of the liquid crystal device according to the second embodiment. FIG. 12A is the same as the first process shown in FIG. 9A according to the first embodiment. FIG. 12B is the same as the second process shown in FIG. 9B. In the second embodiment, after the wirings 62 and the terminal body portions 70 formed in the same layer as the data lines 3 in the region 61 are formed, when the pixel electrodes 11 (first electrodes) are formed as shown in FIG. 5G, an ITO film is also deposited in the region 61. The ITO film is then patterned so as to cover the terminal body portions 70, thus forming lower layer terminal electrode portions 72 (first sub-process of the second process). In this manner, a state shown in FIG. 12C is obtained. Note that the ITO film may be configured to cover the wirings 62 as well. FIG. 12D is the same as the third process shown in FIG. 9C according to the first embodiment. FIG. 12E is the same as the fourth process shown in FIG. 9D. FIG. 12F is the same as the fifth process shown in FIG. 9E.

Here, FIG. 12F shows a configuration in the region 61 according to the second embodiment. The wirings 62 and the terminal body portions 70 are conductive films formed simultaneously with the data lines 3 and made of the same material as that of the data lines 3. In the second embodiment, the terminal body portions 70 are covered with the lower layer terminal electrode portions 72. Thus, the terminal body portions 70 that are thus covered with the lower layer terminal electrode portions 72 are further covered with the terminal insulating film 77. However, the terminal insulating film 77 opens in the form of a substantially rectangular shape at each opening 82 on the terminal connection 63 of the terminal body portion 70. The terminal electrode portions 71 are provided so as to cover the openings 82 and the feet of the terminal body portions 70. Note that the terminal insulating film 77 also covers the wirings 62.

When the terminals 202 are configured as in the case of the second embodiment, similar to the first embodiment, the terminal insulating film 77 that is formed at the same time with the fourth interlayer insulating film 27 provided between the pixel electrodes 11 and the common electrode 17 may be used as a passivation film for the terminal body portions 70 (the wirings 62, the data lines 3) and, in addition, the terminal body portions 70 are formed at the same time with the data lines 3 formed below the third interlayer insulating film 26. Thus, portions that extend from the terminals 202 through the wirings 62 to the data lines 3 are integrated. Further, in the second embodiment, since, in the terminals 202, the terminal connections 63, which serve as connections with the mounting components, each are formed of two layers consisting of the lower layer terminal electrode portion 72 and the terminal electrode portion 71, the terminal body portions 70, which are metal portions, may be reliably overlapped.

Note that the second embodiment has the same advantageous effects as those of the first embodiment in terms that electrical conduction is ensured by not providing the third interlayer insulating film 26 as a planarizing film in the region 61, anti-corrosion of the terminal body portions 70 is improved and connection reliability is improved with a passivation film formed by the terminal insulating film 77.

In the second embodiment as well, as in the case of FIG. 10 and FIG. 11 in the first embodiment, the second interlayer insulating film 25 extends into the region 61, the passivation film for the terminal body portions 70 (the wirings 62) may be formed of two-layer structure that includes the second interlayer insulating film 25 in addition to the fourth interlayer insulating film 27, which is the terminal insulating film 77, and corrosion of the terminal body portions 70 is thus effectively prevented. In addition, in the second embodiment, in the region 61, the terminal insulating film 77 is formed all over the entire region other than the openings 82. However, the region in which the lower layer terminal electrode portions 72 are formed are already covered with the lower layer terminal electrode portions 72, so that the terminal insulating film 77 in the region may be removed.

Third Embodiment

A liquid crystal device according to a third embodiment of the invention will now be described. The liquid crystal device according to the third embodiment, in short, is configured so that the lower layer terminal electrode portions 72 that cover the terminal body portions 70 in the second embodiment are removed at the terminal connections 63 and left at the side portions 64. That is, in the third embodiment, the side portions 64 are covered with two layers of ITO film, and the terminal connections 63 are covered with one layer of ITO film.

Figure 13A:
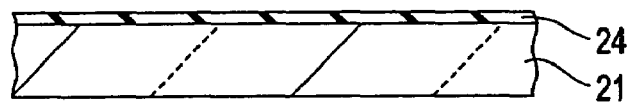
FIG. 13A to FIG. 13F are cross-sectional views showing a process of manufacturing portions around terminals of the liquid crystal device according to a third embodiment.
Figure 13B:
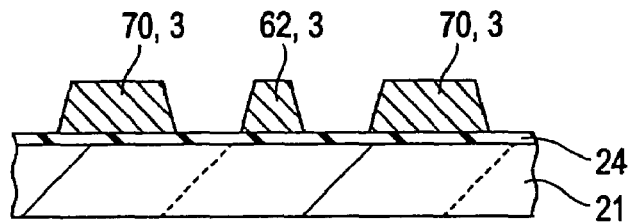
Figure 13C:
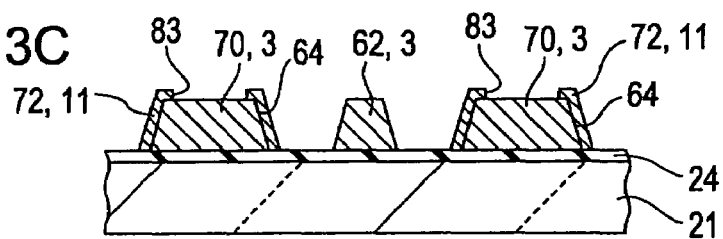
Figure 13D:
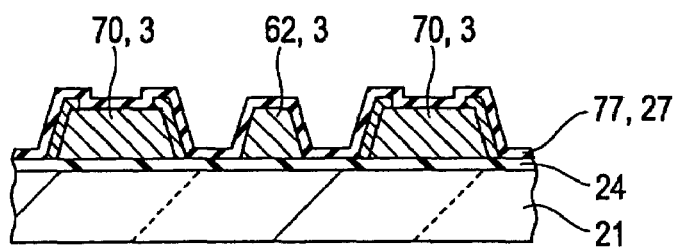
Figure 13E:
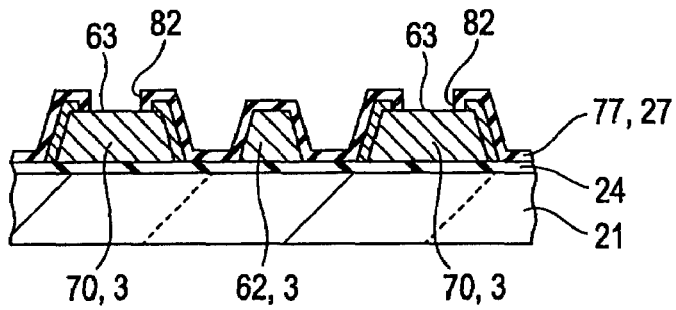
Figure 13F:
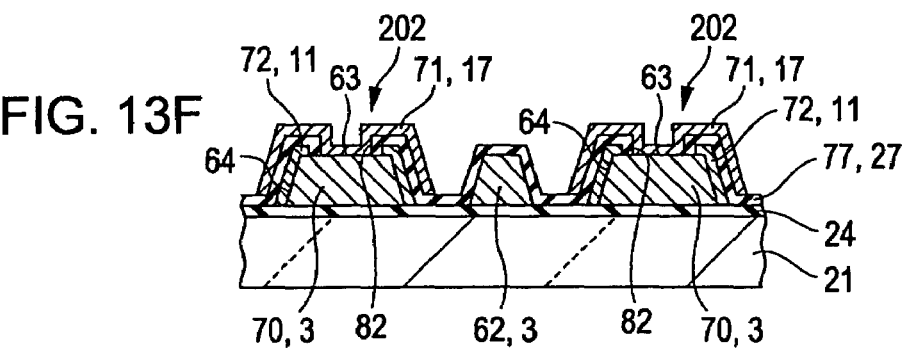

FIG. 13A to FIG. 13F are cross-sectional views, taken along the line VII-VII in FIG. 6, showing a process of manufacturing the region 61 in the TFT array substrate 10 of the liquid crystal device according to the third embodiment. FIG. 13A is the same as the first process shown in FIG. 9A according to the first embodiment. FIG. 13B is also the same as the second process shown in FIG. 9B. In the third embodiment, after the wirings 62 and the terminal body portions 70 formed in the same layer as the data lines 3 in the region 61, when the pixel electrodes 11 (first electrodes) are formed as shown in FIG. 5G, an ITO film is also deposited in the region 61. The ITO film is then patterned so as to cover the side portions 64 of the terminal body portions 70, and the lower layer terminal electrode portions 72 are formed so as to open at first openings 83 (second sub-process of the second process). In this manner, a state shown in FIG. 13C is obtained. FIG. 13D is the same as the third process shown in FIG. 9C according to the first embodiment. FIG. 13E is the same as the fourth process shown in FIG. 9D. FIG. 13F is the same as the fifth process shown in FIG. 9E.

Here, FIG. 13F shows a configuration in the region 61 according to the third embodiment. The wirings 62 and the terminal body portions 70 are conductive films formed simultaneously with the data lines 3 and made of the same material as that of the data lines 3.

In the third embodiment, the lower layer terminal electrode portions 72 cover the side portions 64 of the terminal body portions 70 but open at the first openings 83 on the terminal connections 63. Thus, the terminal body portions 70 that are covered with the lower layer terminal electrode portions 72 are further covered with the terminal insulating film 77. However, the terminal insulating film 77 opens in the form of a rectangular shape at each of the openings 82 on the terminal connections 63 of the terminal body portions 70. The terminal electrode portions 71 are provided so as to cover the openings 82 and the feet of the terminal body portions 70. Note that the terminal insulating film 77 covers the wirings 62 as well.

When the terminals 202 are configured according to the third embodiment, similar to the first embodiment, the terminal insulating film 77 that is formed at the same time with the fourth interlayer insulating film 27 provided between the pixel electrodes 11 and the common electrode 17 may be used as a passivation film for the terminal body portions 70 (the wirings 62, the data lines 3) and, in addition, the terminal body portions 70 are formed at the same time with the data lines 3 formed below the third interlayer insulating film 26. Thus, portions that extend from the terminals 202 through the wirings 62 to the data lines 3 are integrated. In addition, the side portions 64 of the terminal body portions 70 are protected by two layers that include the terminal insulating film 77 and the terminal electrode portions 71 in the first embodiment, while, on the other hand, the side portions 64 are protected by three layers that include the lower layer terminal electrode portions 72, the terminal insulating film 77 and the terminal electrode portions 71 in the third embodiment. Thus, it is possible to protect the side portions 64 of the terminal body portions 70 more reliably in the third embodiment than in the first embodiment. Note that this protection is the same as in the case of the second embodiment.

Note that the third embodiment has the same advantageous effects as those of the first embodiment in terms that electrical conduction is ensured by not providing the third interlayer insulating film 26 as a planarizing film in the region 61, anti-corrosion of the terminal body portions 70 is improved and connection reliability is improved with a passivation film formed by the terminal insulating film 77. In addition, in the third embodiment as well, as in the case shown in FIG. 10 and FIG. 11 in the first embodiment, the second interlayer insulating film 25 extends into the region 61, the passivation film for the terminal body portions 70 (the wirings 62) may be formed of two-layer structure that includes the second interlayer insulating film 25 in addition to the fourth interlayer insulating film 27, which is the terminal insulating film 77, and corrosion of the terminal body portions 70 is thus effectively prevented. In the third embodiment, in the region 61, the terminal insulating film 77 is formed all over the entire region other than the openings 82. However, the region in which the lower layer terminal electrode portions 72 are formed are already covered with the lower layer terminal electrode portions 72, so that the terminal insulating film 77 in the region may be removed as in the case of the above described embodiment.

Here, a comparison is made with respect to the area of each terminal connection 63. When the size of each terminal body portion 70 is the same, the area of each terminal connection 63 may be made larger in the first embodiment than in the third embodiment. This is because, according to the first embodiment, the terminal electrode portions 71 are directly formed in the openings 82. On the other hand, in the third embodiment, each of the terminal connections 63 is formed slightly smaller than the openings 82 of the first embodiment because the openings 82 are formed inside the first openings 83.

Therefore, in terms of ensuring good electrical conduction by increasing the areas of the terminal connections 63, the first embodiment is more preferable than the third embodiment.

Fourth Embodiment

Figure 15:
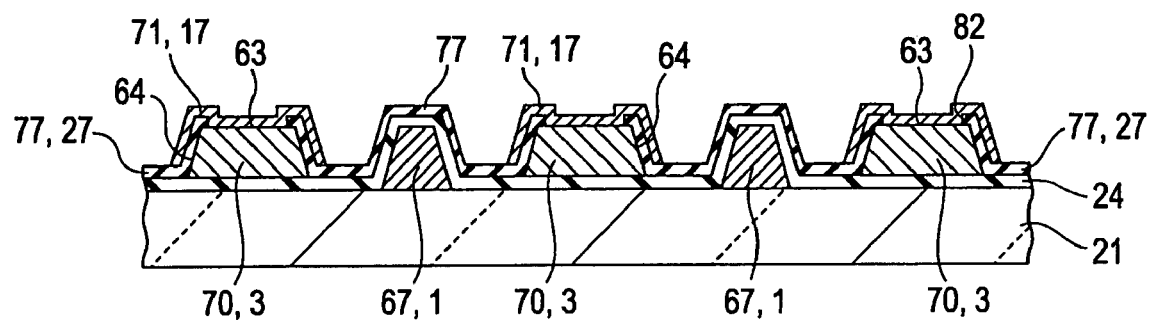
FIG. 15 is a cross-sectional view that is taken along the line XV-XV in FIG. 14.
Figure 16:
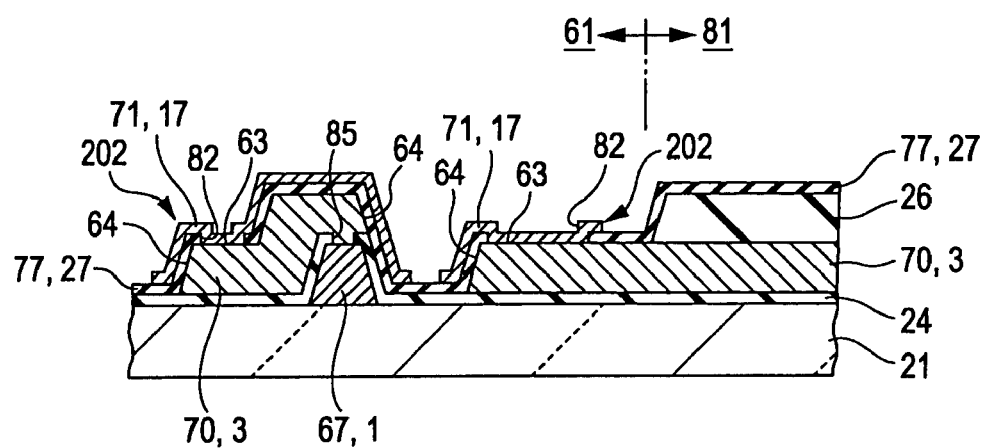
FIG. 16 is a cross-sectional view that is taken along the line XVI-XVI in FIG. 14.

Terminals of a liquid crystal device according to a fourth embodiment of the invention will now be described with reference to FIG. 14 to FIG. 16. The liquid crystal device according to the fourth embodiment, in short, is configured so that, in portions of the terminals 202 according to the first embodiment, wirings from which or to which the terminal body portions 70 extend are changed to wirings 67 formed in the same layer as the scanning lines 1.

Figure 14:
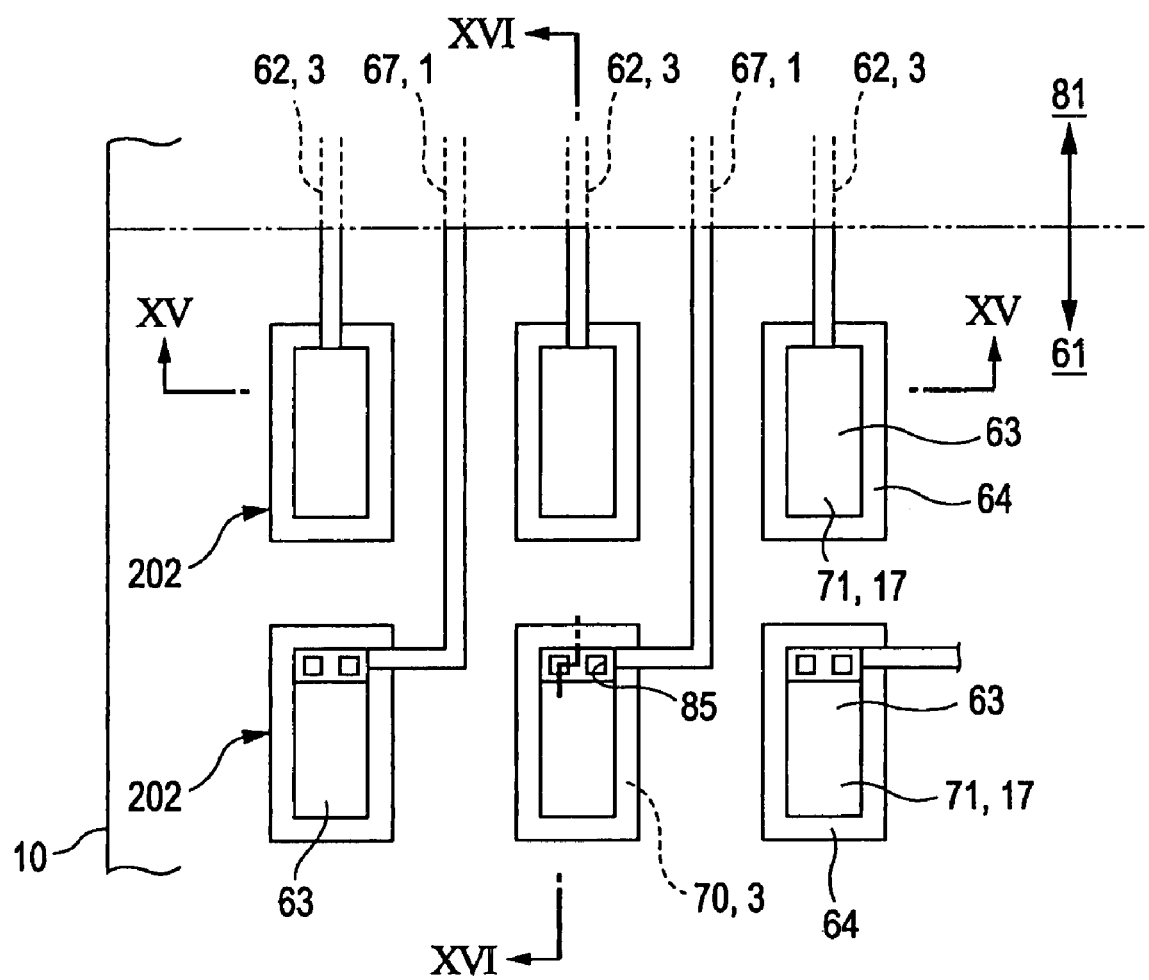
FIG. 14 is an enlarged plan view of portions around terminals in the liquid crystal device according to a fourth embodiment.

FIG. 14 is an enlarged plan view of a region in which terminals are formed according to the fourth embodiment. FIG. 15 is a cross-sectional view that is taken along the line XV-XV in FIG. 14. FIG. 16 is a cross-sectional view that is taken along the line XVI-XVI in FIG. 14.

As shown in FIG. 14, the plurality of terminals 202 are arranged in the region 61 in two rows. Of these two rows, the terminal body portions 70 in the terminals 202 arranged in the upper side row in the drawing, that is, in the row adjacent to the region 81 have the same configuration as those of the first embodiment. On the other hand, the terminal body portions 70 in the terminals 202 arranged in the lower side row in FIG. 14 are electrically connected through contact holes (through-holes) 85 to the wirings 67 that are formed in the same layer as the gate layers that form the scanning lines 1 (common lines 2). Specifically, as shown in FIG. 16, in the terminal body portions 70 in the lower side row of the terminals 202, the first interlayer insulating film 24 that covers the wirings 67 opens at the contact holes 85, and the terminal electrode portions 71 are then connected through the contact holes 85 to the terminal body portions 70. Note that the terminal insulating film 77 that covers the terminal body portions 70 opens at the openings 82 of the terminal connections 63, the terminal electrode portions 71 are connected through the openings 82 to the terminal body portions 70 and formed so as to cover the side portions 64 of the terminal body portions 70. This is the same as in the case of the first embodiment.

Figure 17A:
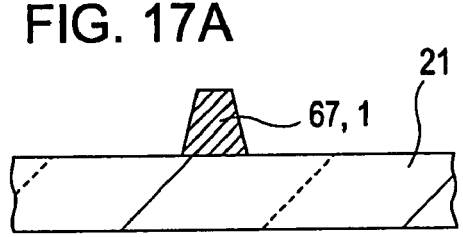
FIG. 17A to FIG. 17F are cross-sectional views showing a process of manufacturing portions around terminals in the liquid crystal device.

FIG. 17A to FIG. 17F are cross-sectional views, taken along the line XVI-XVI in FIG. 14, showing a process of manufacturing the region 61 in the TFT array substrate 10 of the liquid crystal device according to the fourth embodiment. No gate insulating film 23, which is formed in the display area, is provided in the regions 61, 81. Therefore, when the scanning lines 1 and the common lines 2 are formed as shown in FIG. 5D, a molybdenum film is deposited in the region 61 so as to pattern the wirings 67. The wirings 67 are then formed just on the transparent substrate 21 as shown in FIG. 17A (first sub-process of the first process).

Figure 17B:
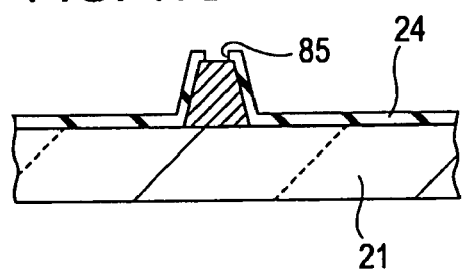
Figure 17C:
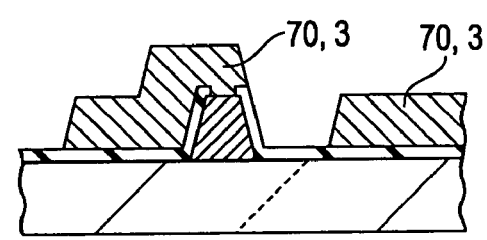
Figure 17D:
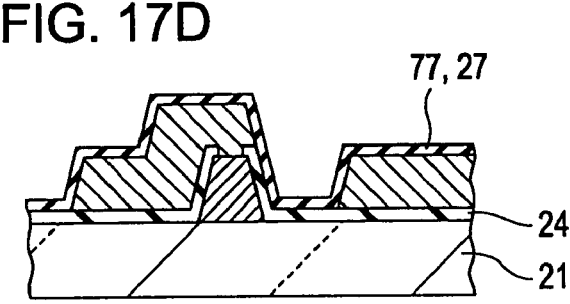
Figure 17E:
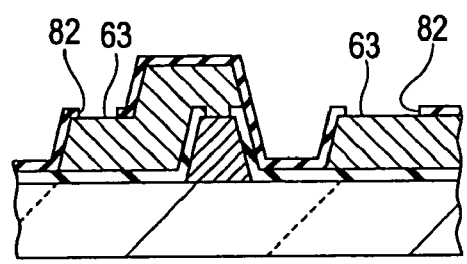
Figure 17F:
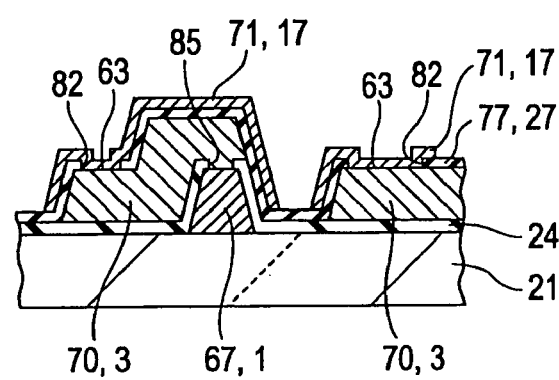

After the first interlayer insulating film 24 is deposited as shown in FIG. 5E, this film patterned through known photolithography process or etching process to form the contact holes 85 on the wirings 67 (second sub-process of the first process). In this manner, a state shown in FIG. 17B is obtained. FIG. 17C is the same as the second process shown in FIG. 9B according to the first embodiment. FIG. 17D is the same as the third process shown in FIG. 9C. FIG. 17E is the same as the fourth process shown in FIG. 9D. FIG. 17F is the same as the fifth process shown in FIG. 9E.

When the terminals 202 are thus configured, in addition to the advantageous effects of the first embodiment, because the wirings 67 are formed in the deeper layer than the wirings 67 at the same time with the scanning lines 1 (common lines 2), the terminals 202, when they are formed considerably adja-cent to each other, are not short-circuited, and it is possible to arrange a large number of terminals 202 and also possible to further improve anti-corrosion of the wirings 67.

Fifth Embodiment

Terminals of a liquid crystal device according to a fifth embodiment of the invention will now be described. The liquid crystal device according to the fifth embodiment, in short, is configured so that, in portions of the terminals 202 according to the second embodiment, wirings from which or to which the terminal body portions 70 extend are changed to the wirings 67 formed in the same layer as the scanning lines 1, as in the case of the fourth embodiment.

Figure 18A:
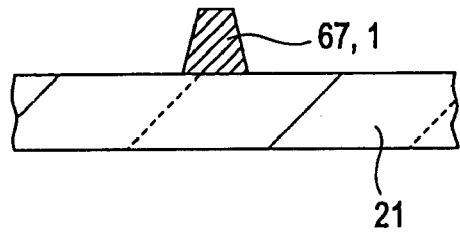
FIG. 18A to FIG. 18G are cross-sectional views showing a process of manufacturing portions around terminals in the liquid crystal device according to a fifth embodiment.
Figure 18B:
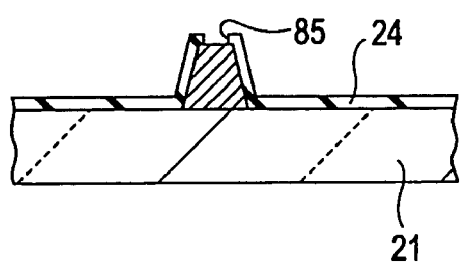
Figure 18C:
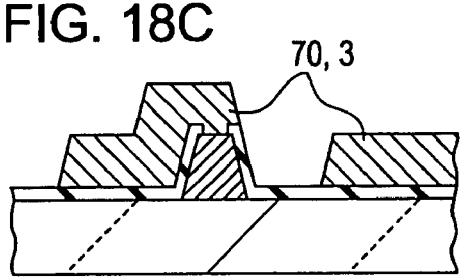
Figure 18D:
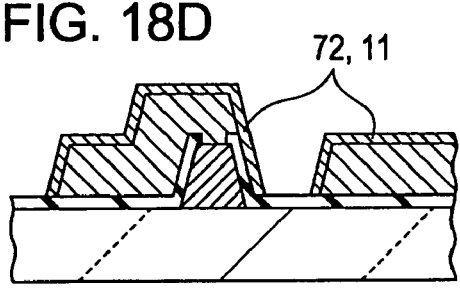
Figure 18E:
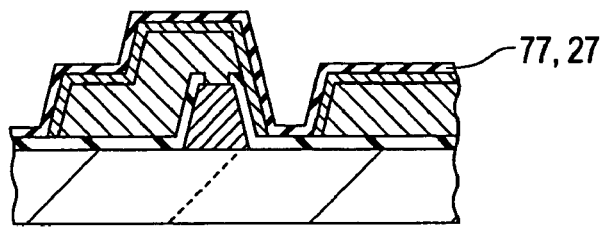
Figure 18F:
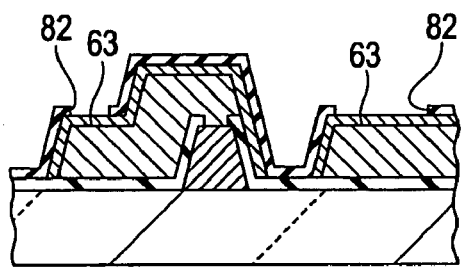
Figure 18G:
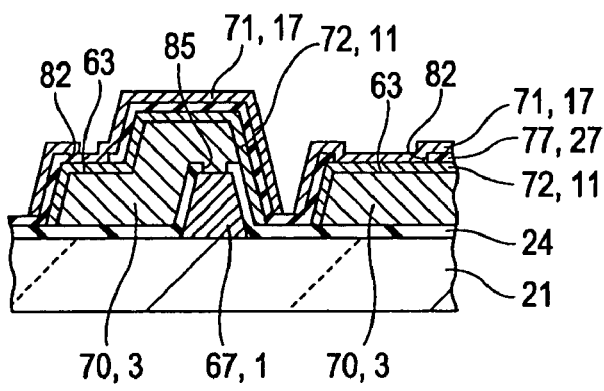

FIG. 18A to FIG. 18G are cross-sectional views, taken along the line XVI-XVI in FIG. 14, showing a process of manufacturing the region 61 in the TFT array substrate 10 of the liquid crystal device according to the fifth embodiment. FIG. 18A to FIG. 18C are the same as FIG. 17A to FIG. 17C according to the fourth embodiment. In the fifth embodiment, after the terminal body portions 70 (wirings 62) are formed in the same layer as the data lines 3 in the region 61, when the pixel electrodes 11 (first electrodes) are formed, an ITO film is also deposited in the region 61. The ITO film is then patterned so as to cover the terminal body portions 70, thus forming the lower layer terminal electrode portions 72. In this manner, a state shown in FIG. 18D is obtained. FIG. 18E to FIG. 18G are the same as FIG. 17D to FIG. 17F according to the fourth embodiment.

Consequently, the terminals of the liquid crystal device according to the fifth embodiment have the configuration shown in FIG. 18G. Therefore, in the fifth embodiment, in addition to the advantageous effects of the second embodiment, the same advantageous effects as those in the fourth embodiment are obtained in the fifth embodiment in that the terminals 202, when they are formed considerably adjacent to each other, are not short-circuited, and it is possible to arrange a large number of terminals 202 and also possible to further improve anti-corrosion of the wirings 67.

Sixth Embodiment

Terminals of a liquid crystal device according to a sixth embodiment of the invention will now be described. The liquid crystal device according to the sixth embodiment, in short, is configured so that, in portions of the terminals 202 according to the third embodiment, wirings from which or to which the terminal body portions 70 extend are changed to the wirings 67 formed in the same layer as the scanning lines 1, as in the case of the fourth embodiment.

Figure 19A:
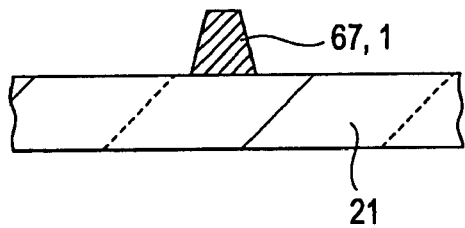
FIG. 19A to FIG. 19G are cross-sectional views showing a process of manufacturing portions around terminals in the liquid crystal device according to a sixth embodiment.
Figure 19B:
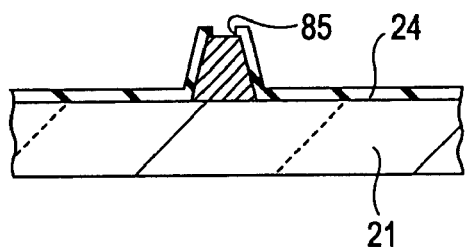
Figure 19C:
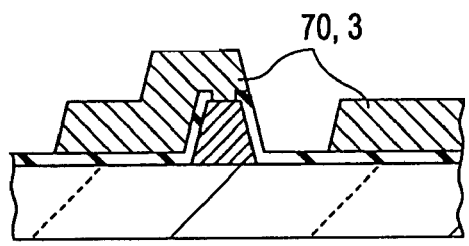
Figure 19D:
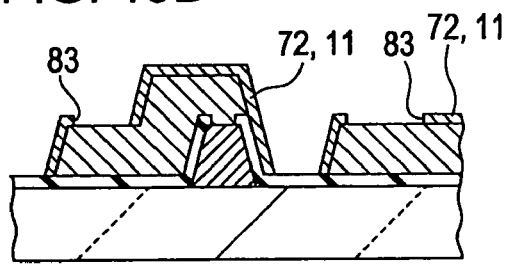
Figure 19E:
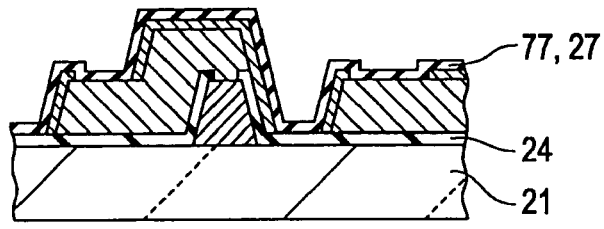
Figure 19F:
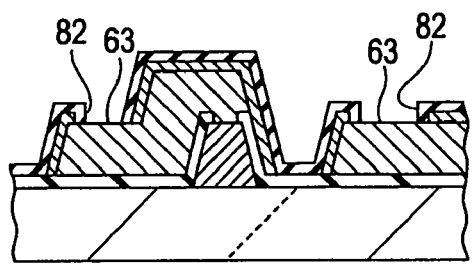
Figure 19G:
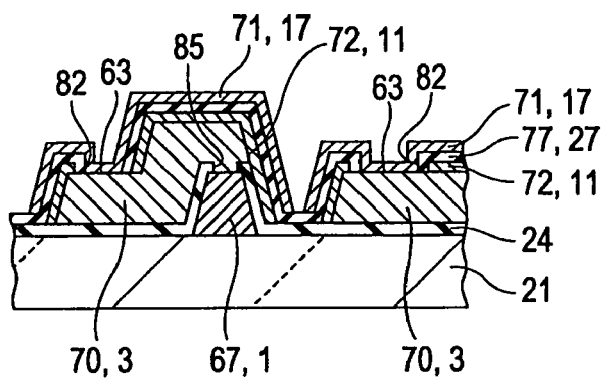

FIG. 19A to FIG. 19G are cross-sectional views, taken along the line XVI-XVI in FIG. 14, showing a process of manufacturing the region 61 in the TFT array substrate 10 of the liquid crystal device according to the sixth embodiment. FIG. 19A to FIG. 19C are the same as FIG. 17A to FIG. 17C according to the fourth embodiment. In the sixth embodiment, after the terminal body portions 70 (wirings 62) formed in the same layer as the data lines 3 in the region 61 are formed, when the pixel electrodes 11 (first electrodes) are formed, an ITO film is also deposited in the region 61. The ITO film is then patterned so as to cover the terminal body portions 70 and open at the first openings 83, thus forming the lower layer terminal electrode portions 72. In this manner, a state shown in FIG. 19D is obtained. FIG. 19E to FIG. 19G are the same as FIG. 17D to FIG. 17F according to the fourth embodiment.

Consequently, the terminals of the liquid crystal device according to the sixth embodiment have the configuration shown in FIG. 19G. Therefore, in the sixth embodiment, in addition to the advantageous effects of the third embodiment, the same advantageous effects as those in the fourth embodiment are obtained in the sixth embodiment in that the terminals 202, when they are formed considerably adjacent to each other, are not short-circuited, and it is possible to arrange a large number of terminals 202 and also possible to further improve anti-corrosion of the wirings 67.

In the fourth to sixth embodiments as well, as in the case shown in FIG. 10 and FIG. 11 in the first embodiment, the second interlayer insulating film 25 extends into the region 61, the passivation film for the terminal body portions 70 (the wirings 62) may be formed of two-layer structure that includes the second interlayer insulating film 25 in addition to the fourth interlayer insulating film 27, which is the terminal insulating film 77, and corrosion of the terminal body portions 70 is thus effectively prevented.

Seventh Embodiment

Figure 20:
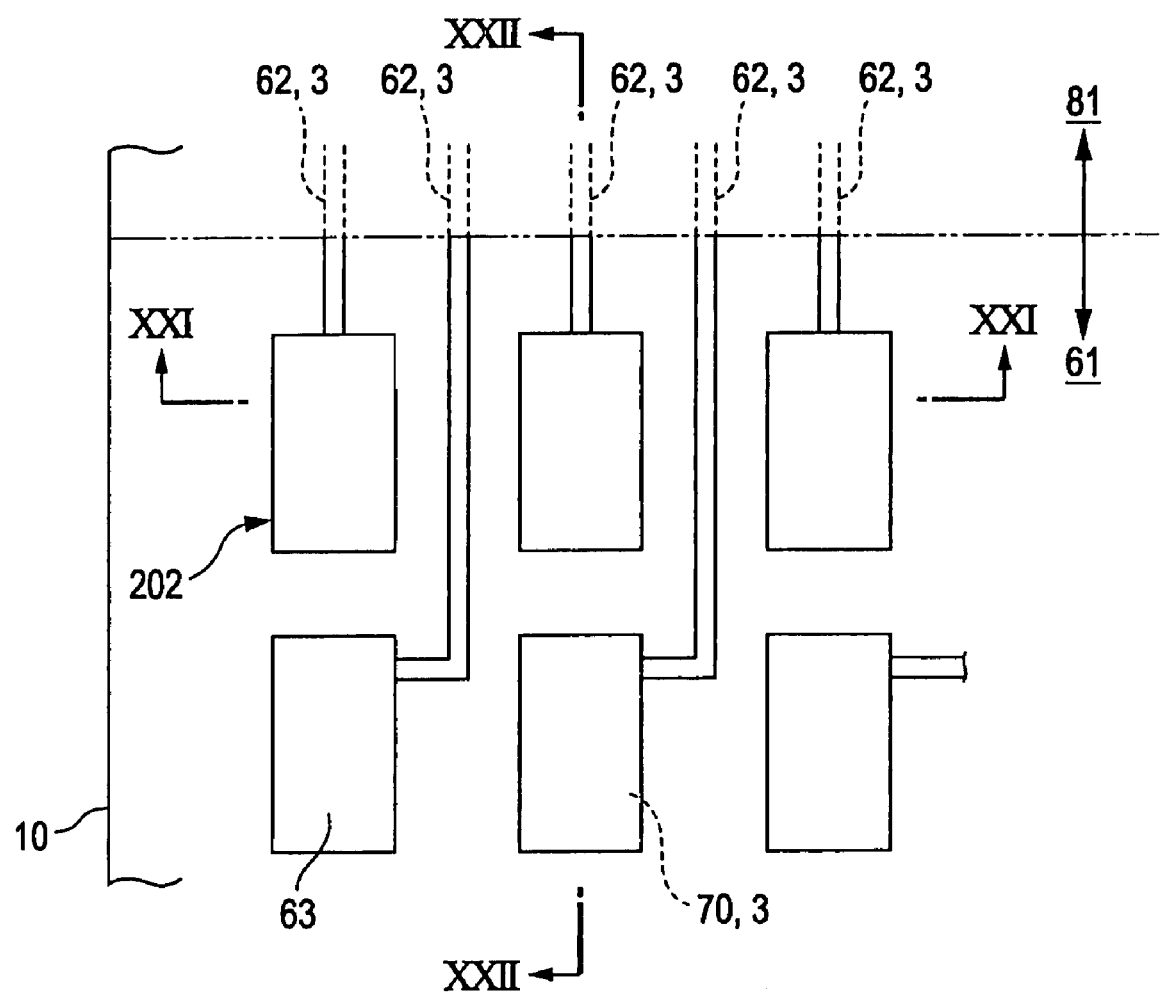
FIG. 20 is an enlarged plan view of portions around terminals in the liquid crystal device according to a seventh embodiment.
Figure 21:
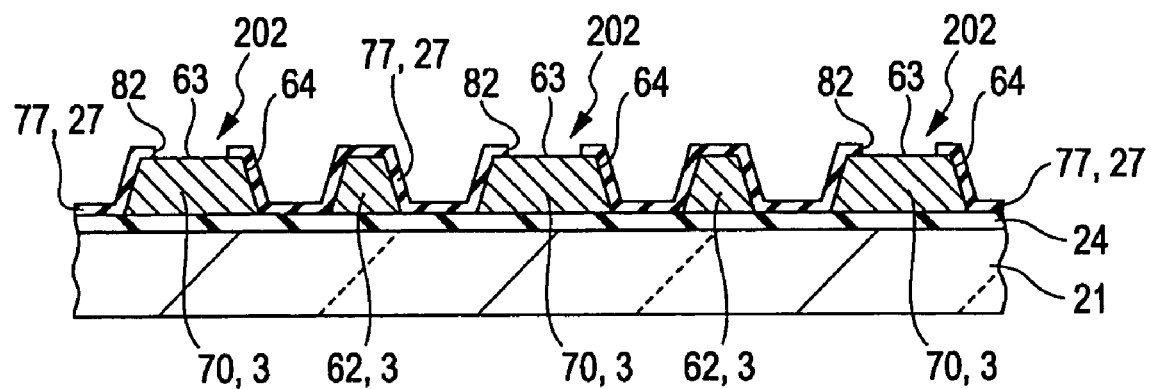
FIG. 21 is a cross-sectional view that is taken along the line XXI-XXI in FIG. 20.
Figure 22:
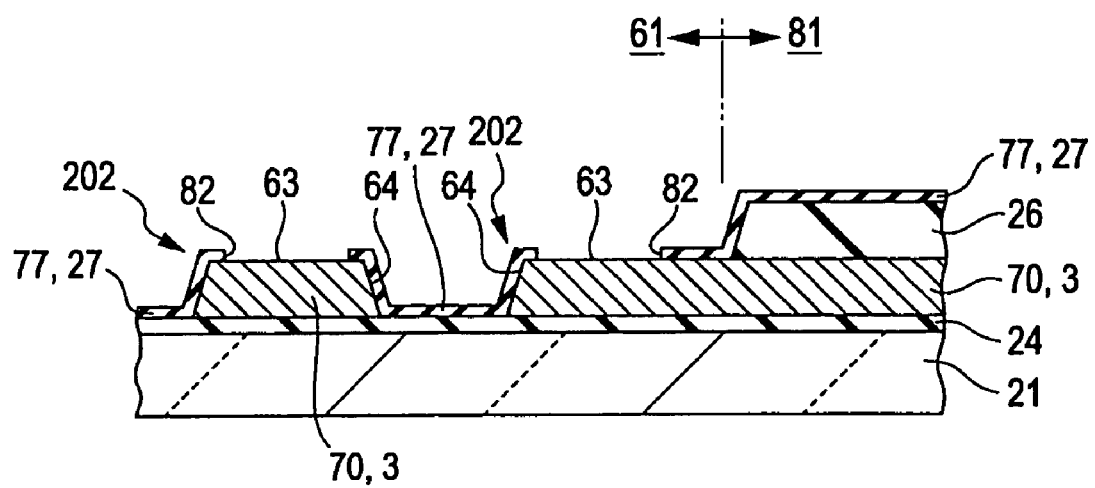
FIG. 22 is a cross-sectional view that is taken along the line XXII-XXII in FIG. 20.
Figure 23A:
FIG. 23A to FIG. 23D are cross-sectional views showing a process of manufacturing portions around terminals in the liquid crystal device.
Figure 23B:
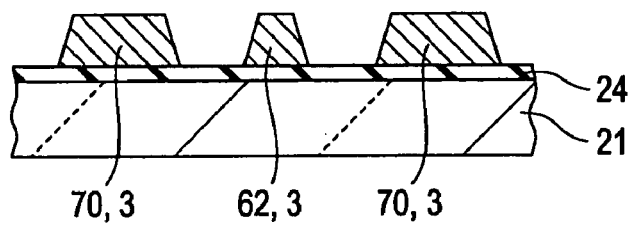
Figure 23C:
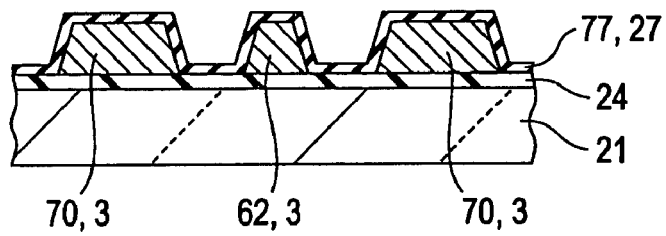
Figure 23D:
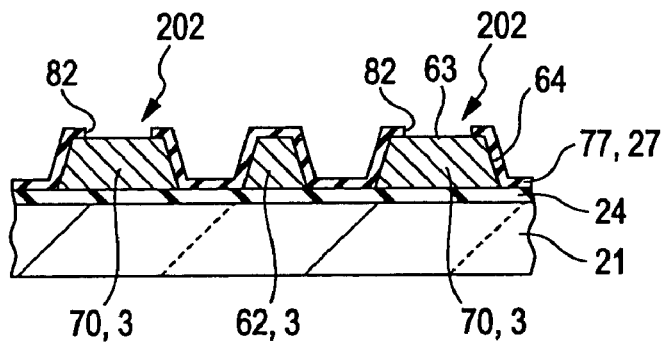

Terminals of a liquid crystal device according to a seventh embodiment of the invention will now be described. FIG. 20 is an enlarged plan view of a region in which terminals are formed according to the seventh embodiment. FIG. 21 is a cross-sectional view that is taken along the line XXI-XXI in FIG. 20. FIG. 22 is a cross-sectional view that is taken along the line XXII-XXII in FIG. 20. As shown in these drawings, in the seventh embodiment, no ITO film terminal electrode portions 71 that cover the openings 82 are formed in the terminals 202 of the first embodiment. Thus, of the terminals 202, the surfaces of the terminal body portions 70 that are made of the same material as those of the data lines 3 are exposed at the openings 82 of the terminal insulating film 77. However, other than the openings 82, the surface of the terminal body portions 70, including the side portions 64, are covered with the terminal insulating film 77 and protected.

FIG. 23A to FIG. 23D are cross-sectional views, taken along the line XXI-XXI in FIG. 20, showing a process of manufacturing the region 61 in the TFT array substrate 10 of the liquid crystal device according to the seventh embodiment. As described above, the seventh embodiment is configured so that, because the terminal electrode portions 71 in the first embodiment are removed, a cross-sectional view showing a process of manufacturing shown in FIG. 23A to FIG. 23D omits the drawing corresponding to FIG. 9E of the first embodiment and the other drawings are the same. That is, FIG. 23A to FIG. 23D are the same as FIG. 9A to FIG. 9D of the first embodiment.

When the terminals 202 are configured according to the seventh embodiment, the terminal connections 63 become the terminal body portions 70 themselves without having terminal electrode portions 71 made of ITO film interposed therebetween. Thus, it is possible to reduce connection resistance with the mounting components by that much. Furthermore, because the area of each terminal connection 63 may be made larger by an amount the terminal electrode portions 71 are not provided 71, it is possible to reliably connect the terminal connections 63 with the mounting components. Note that, although in the terminal connections 63, the terminal body portions 70 are temporarily exposed in the manufacturing process, the mounting components are consequently connected thereto, so that anisotropic adhesive is filled therein. Therefore, substantially, the terminal body portions 70 are not exposed to ambient air for a long period of time. In addition, the seventh embodiment has the same advantageous effects as those of the first embodiment in terms that electrical conduction is ensured by not providing the third interlayer insulating film 26 as a planarizing film in the region 61, anti-corrosion of the terminal body portions 70 is improved and connection reliability is improved with a passivation film formed by the terminal insulating film 77.

In the seventh embodiment as well, as in the case shown in FIG. 10 and FIG. 11 in the first embodiment, the second interlayer insulating film 25 extends into the region 61, the passivation film for the terminal body portions 70 (the wirings 62) may be formed of two-layer structure that includes the second interlayer insulating film 25 in addition to the fourth interlayer insulating film 27, which is the terminal insulating film 77, and corrosion of the terminal body portions 70 is thus effectively prevented. In addition, in the seventh embodiment, in the region 61, the terminal insulating film 77 is formed all over the entire region other than the openings 82. However, as in the case of the third embodiment, the lower layer terminal electrode portions 72 may be formed so as to cover the terminal body portions 70 and to open at the first openings 83. Furthermore, it is applicable that no terminal electrode portions 71 are provided so that the seventh embodiment is applied to the fourth to sixth embodiments.

Eighth Embodiment

Figure 24:
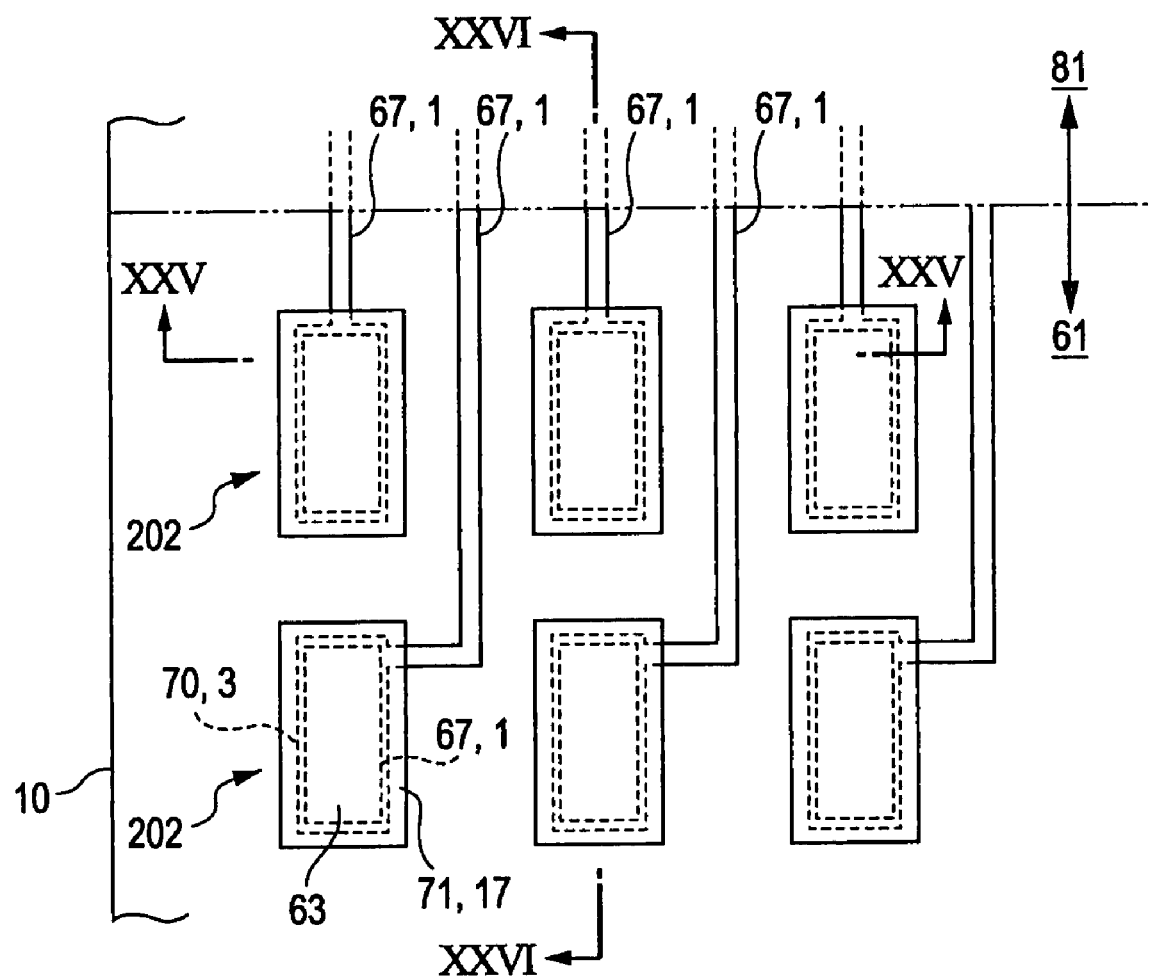
FIG. 24 is an enlarged plan view of portions around terminals in the liquid crystal device according to an eighth embodiment.
Figure 25:
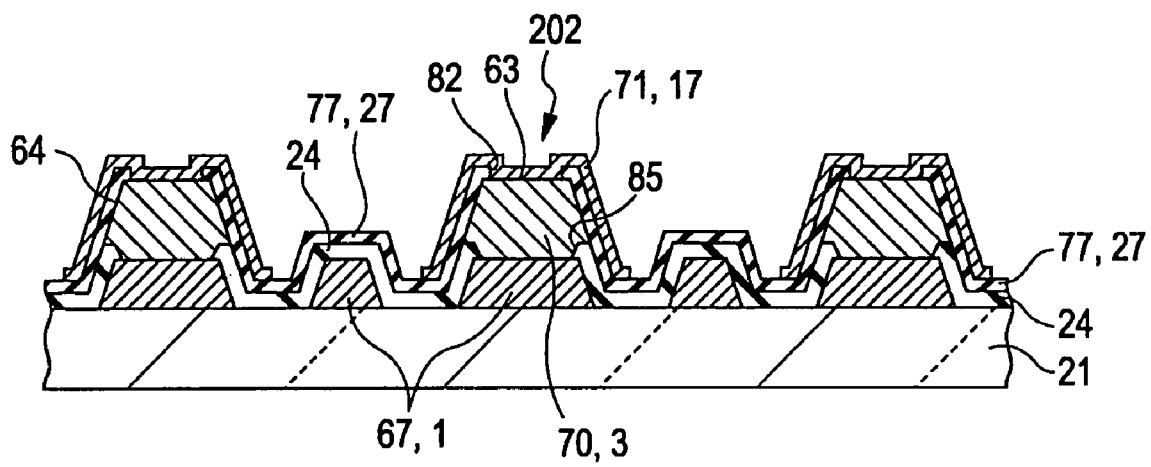
FIG. 25 is a cross-sectional view that is taken along the line XXV-XXV in FIG. 24.
Figure 26:
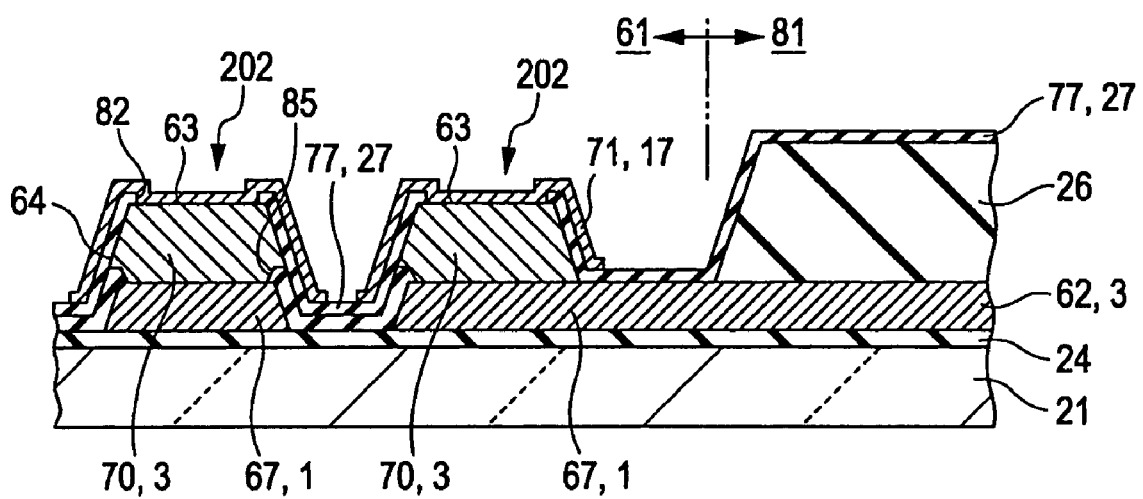
FIG. 26 is a cross-sectional view that is taken along the line XXVI-XXVI in FIG. 24.

Terminals of a liquid crystal device according to an eighth embodiment of the invention will now be described. FIG. 24 is an enlarged plan view of a region in which terminals are formed according to the eighth embodiment. FIG. 25 is a cross-sectional view that is taken along the line XXV-XXV in FIG. 24. FIG. 26 is a cross-sectional view that is taken along the line XXVI-XXVI in FIG. 24. The wirings 67 formed in the same layer as the gate electrodes (scanning lines 1) are connected to the terminal body portions 70 formed in the same layer as the data lines 3 through the contact holes 85 of the first interlayer insulating film 24 in the fourth embodiment. However, as shown in these drawings, in the eighth embodiment, the shape of the wirings 67 is substantially the same as that of the terminal body portions 70 in plan view and connected at the positions that substantially overlap each other in plan view.

According to the eighth embodiment, as compared to the fourth embodiment, not only unevenness in the terminals 202 is reduced but also the terminal connections 63 project more upward, so that it is possible to reliably ensure connection by means of anisotropic conductive particles.

Note that, in FIG. 24 to FIG. 26, the shape of the wirings 67 is substantially the same as that of the terminal body portions 70 in plan view and connected at the positions that overlap each other in the fourth embodiment; however, the eighth embodiment may be applied to the fifth embodiment in which two layers of ITO film cover the terminal connections 63 and the side portions 64 or applied to the sixth embodiment in which one layer of ITO film covers the terminal connections 63. Furthermore, in the eighth embodiment as well, as in the case shown in FIG. 10 and FIG. 11 in the first embodiment, the second interlayer insulating film 25 extends into the region 61, the passivation film for the terminal body portions 70 (the wirings 62) may be formed of two-layer structure that includes the second interlayer insulating film 25 in addition to the fourth interlayer insulating film 27, which is the terminal insulating film 77.

Ninth Embodiment

Figure 27:
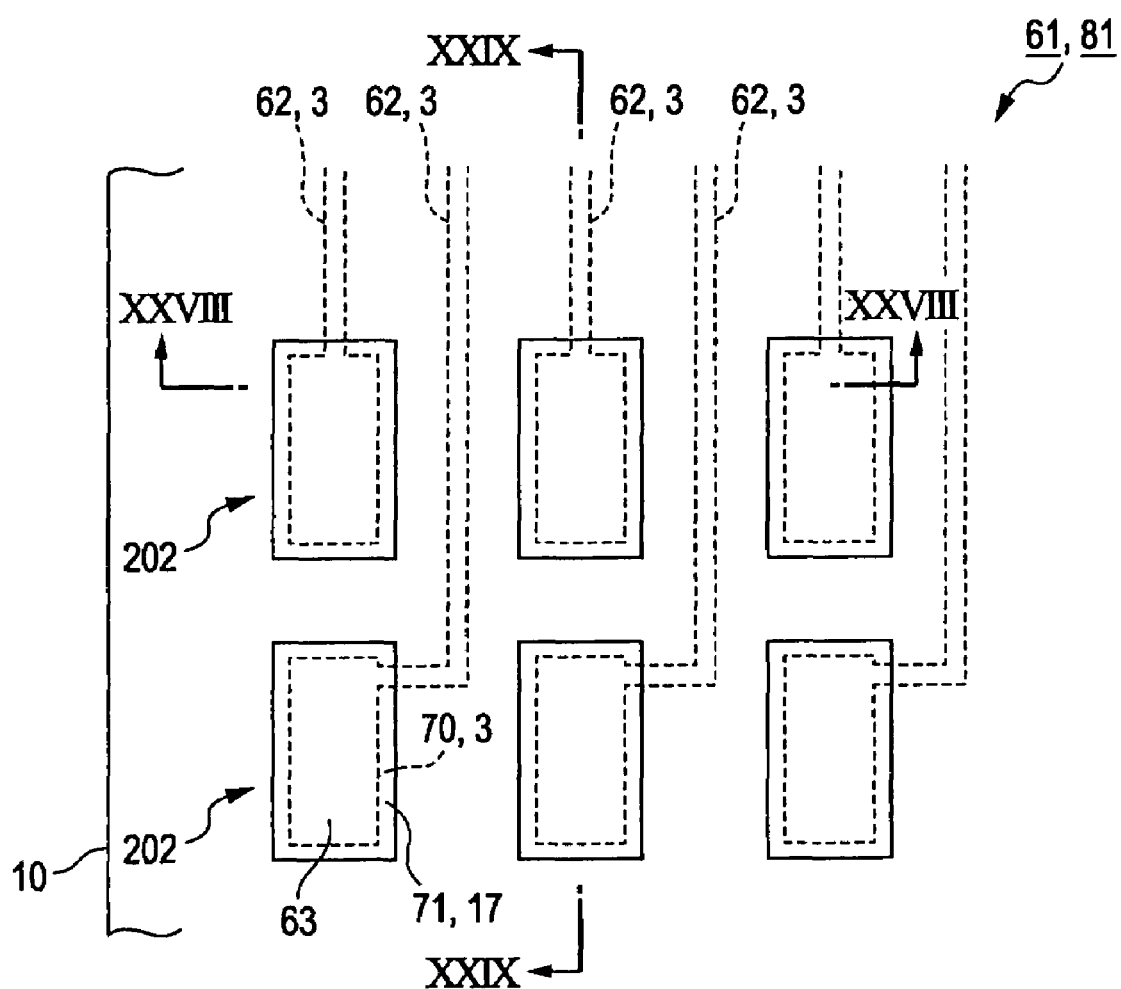
FIG. 27 is an enlarged plan view of portions around terminals in the liquid crystal device according to a ninth embodiment.
Figure 28:
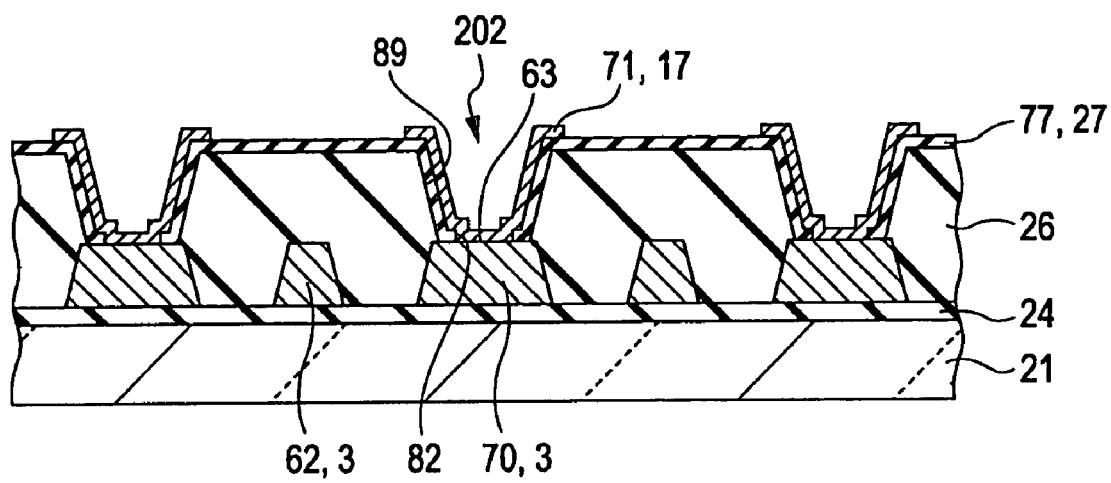
FIG. 28 is a cross-sectional view that is taken along the line XXVIII-XXVIII in FIG. 27.
Figure 29:
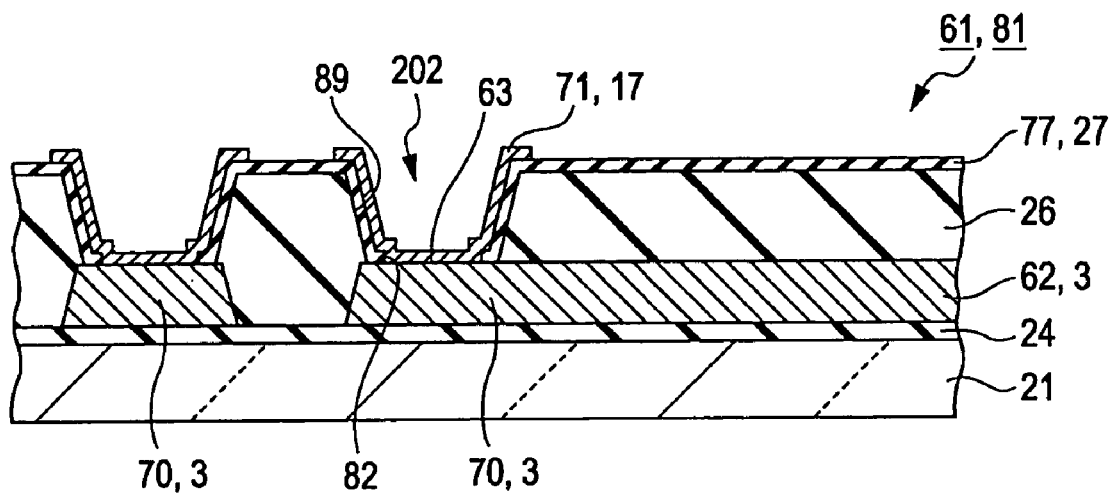
FIG. 29 is a cross-sectional view that is taken along the line XXIX-XXIX in FIG. 27.

Terminals of a liquid crystal device according to a ninth embodiment of the invention will now be described. FIG. 27 is an enlarged plan view of a region in which terminals are formed according to the ninth embodiment. FIG. 28 is a cross-sectional view that is taken along the line XXVIII-XXVIII in FIG. 27. FIG. 29 is a cross-sectional view that is taken along the line XXIX-XXIX in FIG. 27. As shown in these drawings, the ninth embodiment differs from the above described first to eighth embodiments in that the third interlayer insulating film 26 as a planarizing film is left in the region 61 in which the terminals 202 are arranged. In the ninth embodiment, in the terminals 202, in order to communicate the terminal body portions 70 with the outside, the third interlayer insulating film 26 opens in the form of a substantially rectangular shape at second openings 89. The terminal insulating film 77 is provided so as to cover the surface of the third interlayer insulating film 26, in which the second openings 89 are formed, and the terminal body portions 70. The terminal insulating film 77 opens in the form of a rectangular shape at the openings 82 on the terminal body portion 70. Note that the terminal insulating film 77 is the fourth interlayer insulating film 27 in the display area. Then, the terminal electrode portions 71 are formed in a rectangular shape so as to cover the terminal body portions 70 and the second openings 89 in the third interlayer insulating film 26 formed on the upper surface of the terminal body portions 70.

According to the ninth embodiment, the terminal body portions 70 are covered with the third interlayer insulating film 26, which serves as a planarizing film, in addition to the terminal electrode portions 71 and the fourth interlayer insulating film 27 in the first embodiment, so that the terminal body portions 70 are further reliably protected. Note that, in the ninth embodiment as well, as in the case shown in FIG. 10 and FIG. 11 in the first embodiment, the second interlayer insulating film 25 extends into the region 61, the passivation film for the terminal body portions 70 (the wirings 62) may be formed additionally with the fourth interlayer insulating film 27, which is the terminal insulating film 77.

Tenth Embodiment

Figure 30:
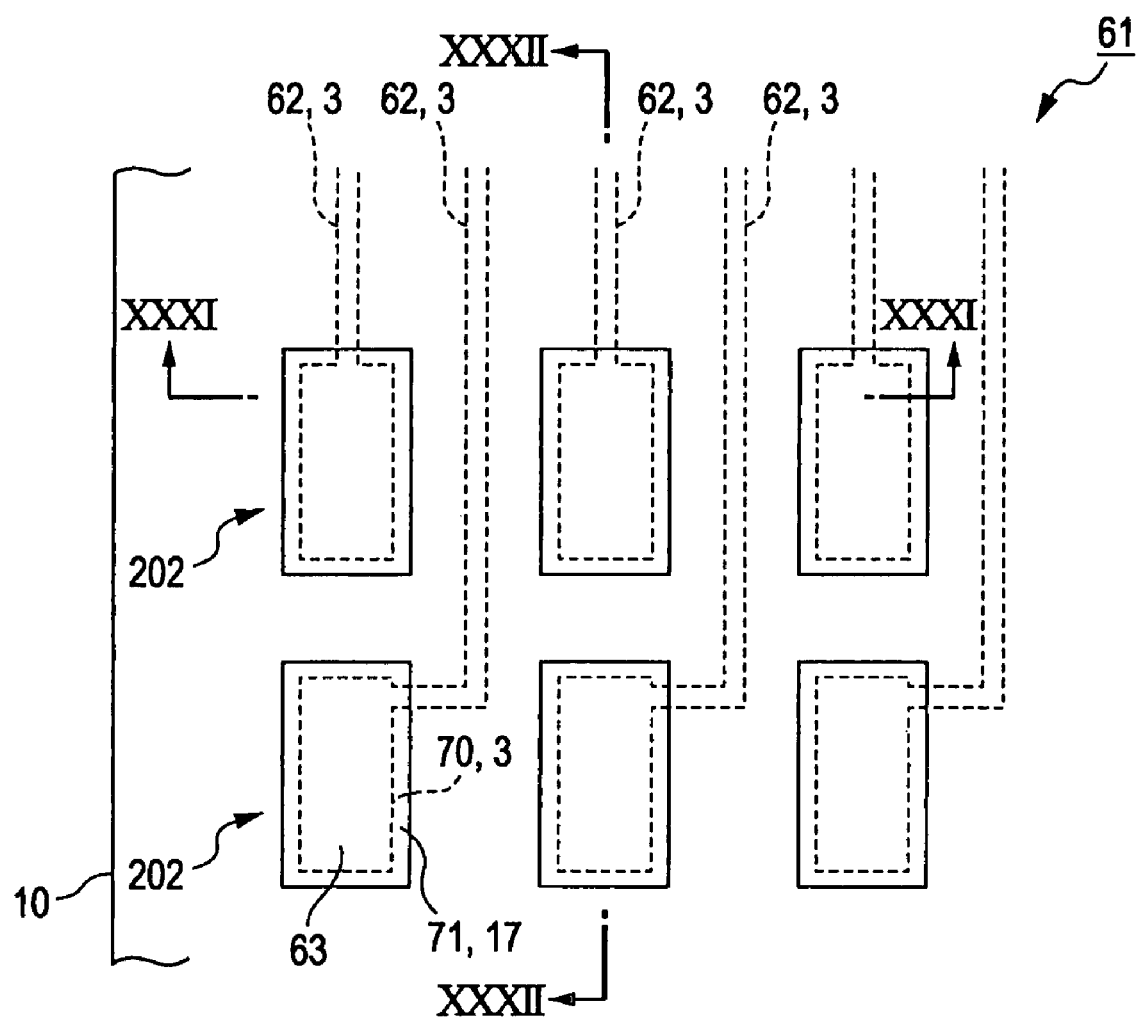
FIG. 30 is an enlarged plan view of portions around terminals in the liquid crystal device according to a tenth embodiment.
Figure 31:
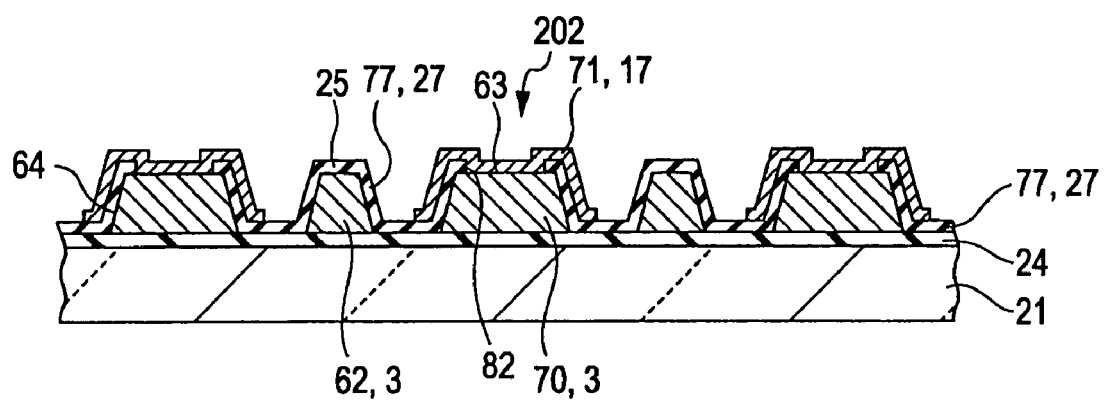
FIG. 31 is a cross-sectional view that is taken along the line XXXI-XXXI in FIG. 30.
Figure 32:
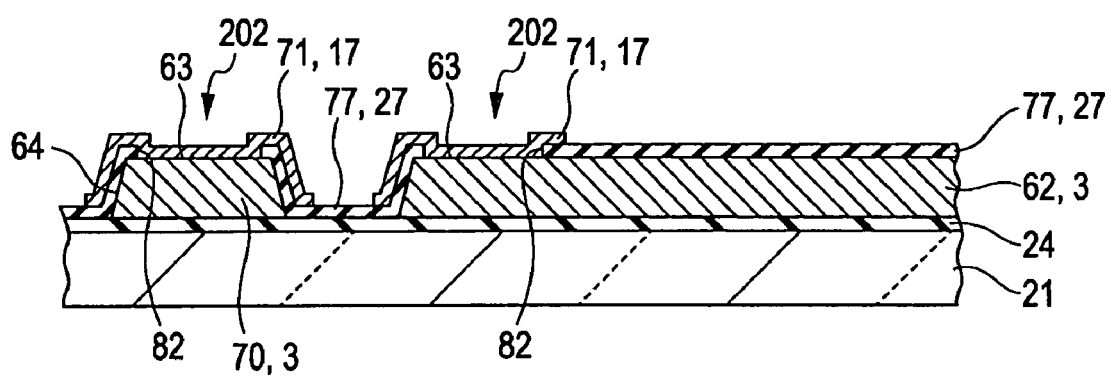
FIG. 32 is a cross-sectional view that is taken along the line XXXII-XXXII in FIG. 30.

Terminals of a liquid crystal device according to a tenth embodiment of the invention will now be described. FIG. 30 is an enlarged plan view of a region in which terminals are formed according to the tenth embodiment. FIG. 31 is a cross-sectional view that is taken along the line XXXI-XXXI in FIG. 30. FIG. 32 is a cross-sectional view that is taken along the line XXXII-XXXII in FIG. 30. As shown in these drawings, particularly shown in FIG. 32, the tenth embodiment differs from the above described first to eighth embodiments in that no third interlayer insulating film 26 as a planarizing film is formed even in the region 61. Conversely, the tenth embodiment may be applied to a configuration that does not use the third interlayer insulating film 26 as a planarizing film in the display area. Note that at least the terminals 202 in the tenth embodiment have the same structure as those of the first embodiment. Therefore, according to the tenth embodiment, the same functions and advantageous effects as those of the first embodiment are obtained with respect to the terminals 202.

Note that in the above described embodiments, a description was made to the terminals 202 for COG mounting the data line driving circuit 201 or the scanning line driving circuits 104; however, the input terminals 222 (see FIG. 1) that are connected to a flexible substrate also have the same configuration. Thus, it is possible to ensure the input terminals 222 to have the high anti-corrosion as in the case of the terminals 202 or to have good electrical conduction.

In addition, in any one of the embodiments (except the seventh embodiment), the terminal electrode portions 71 (lower layer terminal electrode portions 72) cover the terminal body portions 70 together with the fourth interlayer insulating film 27 (second interlayer insulating film 25). However, the terminal electrode portions 71 may cover the wiring 62 or other aluminum surfaces. The invention is not limited to the above described embodiments, but it may be modified into various alternative embodiments without departing from the scope of the invention. For example, a specific configuration, such as a pattern shape, material, thickness of each electrode, each wiring, or the like, formed on the TFT array substrate may be changed appropriately and not intended to be limited to the above described embodiments. Furthermore, the transmissive liquid crystal device is described as an example in the embodiments, but the display type is not limited to it. The above described embodiments may be applied to a reflective liquid crystal device or a transflective liquid crystal device.

Figure 33:
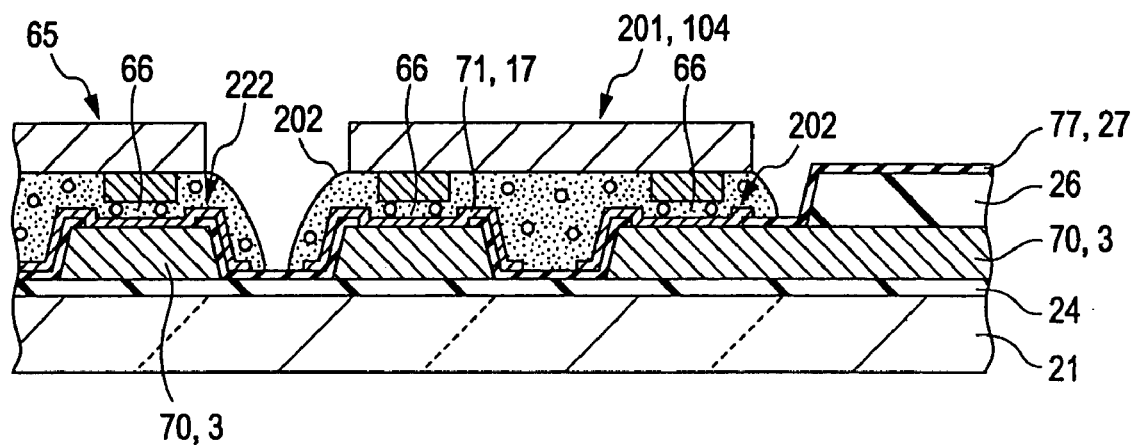
FIG. 33 is a cross-sectional view of portions around terminal to which mounting components are connected.

Subsequently, a state where the mounting components are connected to the terminals, which are described in the above embodiments, will be described with reference to FIG. 33. As shown in the drawing, the mounting components are connected to the terminals formed on the TFT array substrate 10 by means of an anisotropic conductive film (ACF) 66 in which conductive particles are appropriately dispersed. Specifically, the input terminals 222 are connected to a flexible substrate 65 (actually, the terminals of the flexible substrate 65), and the terminals 202 are connected to the data line driving circuit 201 or the scanning line driving circuits 104 (actually, the terminals of the data line driving circuit 201 or the terminals of the scanning line driving circuits 104). With this configuration, it is possible to ensure anti-corrosion owing to good passivation function and good electrical conduction with the mounting components using the terminal structure described in the above embodiments.

Electronic Apparatus

Figure 34:
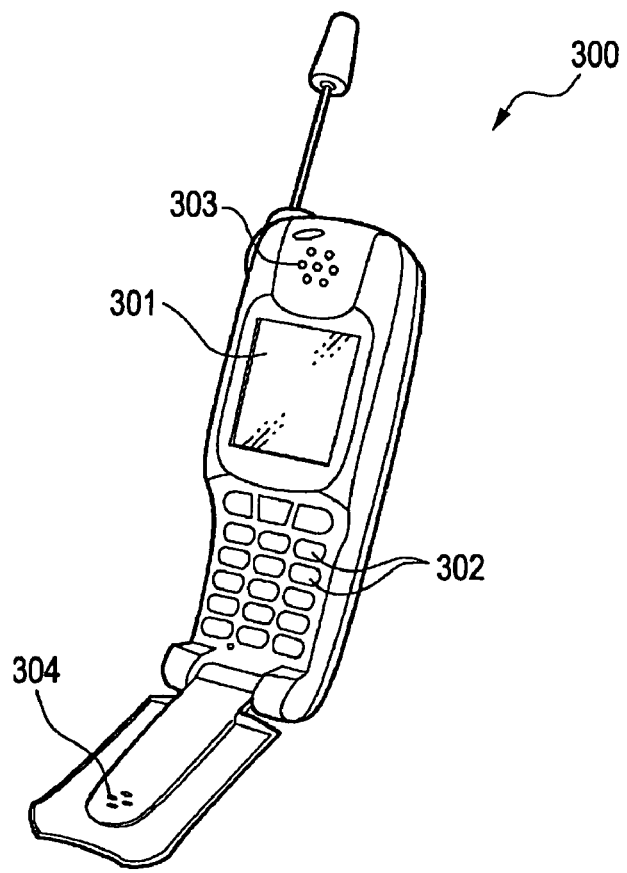
FIG. 34 is a perspective view of an example of an electronic apparatus.

An electronic apparatus that uses the above described liquid crystal device will be described. FIG. 34 is a perspective view of a configuration of a mobile telephone, which is an example of the electronic apparatus. As shown in the drawing, the mobile telephone 300 includes a display portion 301 formed of the liquid crystal device according to the above embodiments, in addition to a plurality of operation buttons 302, an ear piece 303, a mouth piece 304. According to the electronic apparatus, it is possible to implement high anti-corrosion and good electrical conduction at the terminal portion of the liquid crystal device.

Note that the mobile telephone is described as an example of the electronic apparatus, but it is not limited to it. The electronic apparatus may be used as an image display device, such as an electronic book, a personal computer, a digital still camera, a video monitor, a viewfinder or monitor direct view video tape recorder, a car navigation system, a pager, an electronic organizer, an electronic calculator, a word processor, a workstation, a video telephone, a POS terminal, and a device provided with a touch panel.

The entire disclosure of Japanese Patent Application Nos. 2006-223920, filed Aug. 21, 2006 and 2007-190432, Jul. 23, 2007 are expressly incorporated by reference herein.

What is claimed is:

1. A liquid crystal device comprising:

a first substrate;

a second substrate that is opposed to the first substrate, wherein the first substrate and the second substrate hold liquid crystal therebetween;

a switching element;

a signal wiring that is connected to the switching element;
a planarizing film made of insulating film, wherein the planarizing film has a flatness and is provided above the signal wiring and the switching element;
a first electrode that is provided above the planarizing film;
an electrode insulating film that is provided above the first electrode;
a second electrode that is provided above the electrode insulating film and has a plurality of slits, wherein the second electrode generates an electric field that passes through the slits between the first electrode and the second electrode, wherein the switching element, the signal wiring, the planarizing film, the first electrode, the electrode insulating film and the second electrode are formed on or above the first substrate;
a terminal that is provided at least in a portion of a region on the first substrate in which the planarizing film is not formed, wherein the terminal is used for connection with a mounting component, wherein the terminal includes:
  a terminal body portion made of the same material as that of the signal wiring;
  a terminal insulating film made of the same material as that of the electrode insulating film, wherein the terminal insulating film is formed on the terminal body portion so as to cover a side face of the terminal body portion and to open at an opening region in the terminal body portion; and
  a terminal electrode portion made of the same material as that of the second electrode, wherein the terminal electrode portion is formed so as to cover the opening region and the side face of the terminal body portion, and wherein the terminal electrode portion is electrically connected to the terminal body portion through the opening region; and
a terminal wiring that is electrically connected to the terminal, wherein
the terminal wiring and the terminal body portion are formed in different wiring layers via an interlayer insulating film,
the terminal wiring is positioned in a lower layer than the terminal body portion, and
the terminal wiring is electrically connected to the terminal body portion through a through-hole that is formed in the interlayer insulating film.

2. A liquid crystal device comprising:
a first substrate;
a second substrate that is opposed to the first substrate, wherein the first substrate and the second substrate hold liquid crystal therebetween;
a switching element;
a signal wiring that is connected to the switching element;
a planarizing film made of insulating film, wherein the planarizing film has a flatness and is provided above the signal wiring and the switching element;
a first electrode that is provided above the planarizing film;
an electrode insulating film that is provided above the first electrode
a second electrode that is provided above the electrode insulating film and has a plurality of slits, wherein the second electrode generates an electric field that passes through the slits between the first electrode and the second electrode, wherein the switching element, the signal wiring, the planarizing film, the first electrode, the electrode insulating film and the second electrode are formed on or above the first substrate; and
a terminal that is provided at least in a portion of a region on the first substrate in which the planarizing film is not formed, wherein the terminal is used for connection with a mounting component, wherein the terminal includes:
  a terminal body portion made of the same material as that of the signal wiring;
  a first terminal electrode portion made of the same material as that of the first electrode, wherein the first terminal electrode portion is formed so as to cover at least the terminal body portion, and wherein the first terminal electrode portion is electrically connected to the terminal body portion;
  a terminal insulating film made of the same material as that of the electrode insulating film, wherein the terminal insulating film is formed on the terminal body portion so as to cover a side face of the terminal body portion and to open at an opening region in the terminal body portion; and
  a second terminal electrode portion made of the same material as that of the second electrode, wherein the second terminal electrode portion is formed so as to cover the opening region and the side face of the terminal body portion, and wherein the second terminal electrode portion is electrically connected to the first terminal electrode portion through the opening region.

3. A liquid crystal device comprising:
a first substrate;
a second substrate that is opposed to the first substrate, wherein the first substrate and the second substrate hold liquid crystal therebetween;
a switching element;
a signal wiring that is connected to the switching element;
a planarizing film made of insulating film, wherein the planarizing film has a flatness and is provided above the signal wiring and the switching element;
a first electrode that is provided above the planarizing film;
an electrode insulating film that is provided above the first electrode;
a second electrode that is provided above the electrode insulating film and has a plurality of slits, wherein the second electrode generates an electric field that passes through the slits between the first electrode and the second electrode, wherein the switching element, the signal wiring, the planarizing film, the first electrode, the electrode insulating film and the second electrode are formed on or above the first substrate; and
a terminal that is provided at least in a portion of a region on the first substrate in which the planarizing film is not formed, wherein the terminal is used for connection with a mounting component, wherein the terminal includes:
  a terminal body portion made of the same material as that of the signal wiring;
  a first terminal electrode portion made of the same material as that of the first electrode, wherein the first terminal electrode portion is formed so as to cover at least a side face of the terminal body portion, and wherein the first terminal electrode portion has a first opening region formed on the terminal body portion;
  a terminal insulating film made of the same material as that of the electrode insulating film, wherein the terminal insulating film is formed so as to at least cover the first terminal electrode portion, and wherein the terminal insulating film has a second opening region within the first opening region; and
  a second terminal electrode portion made of the same material as that of the second electrode, wherein the second terminal electrode portion is formed at least on the terminal body portion so as to cover the second opening region of the terminal insulating film and the side face of the terminal body portion, and wherein the second terminal electrode portion is electrically connected to the terminal body portion through the second opening region.

4. The liquid crystal device according to claim 1, further comprising:
a scanning line and a data line that are formed on the first substrate and extend to intersect with each other; and
a terminal wiring that is electrically connected to the terminal and made of the same material as that of the scanning line, wherein
the terminal body portion may be made of the same material as that of the data line.

5. The liquid crystal device according to claim 4, further comprising:
a lower insulating film that covers the data line and is positioned in a lower layer than the first electrode, wherein
the side face of the terminal body portion is covered with the lower insulating film and the terminal insulating film.

6. The liquid crystal device according to claim 1, wherein the through-hole is formed at a position that overlaps the terminal body portion in plan view.

7. A liquid crystal device comprising:
a first substrate;
a second substrate that is opposed to the first substrate, wherein the first substrate and the second substrate hold liquid crystal therebetween;
a switching element;
a signal wiring that is connected to the switching element;
a planarizing film made of insulating film, wherein the planarizing film has a flatness and is provided above the signal wiring and the switching element;
a first electrode that is provided above the planarizing film;
an electrode insulating film that is provided above the first electrode;
a second electrode that is provided above the electrode insulating film and has a plurality of slits, wherein the second electrode generates an electric field that passes through the slits between the first electrode and the second electrode, wherein the switching element, the signal wiring, the planarizing film, the first electrode, the electrode insulating film and the second electrode are formed on or above the first substrate; and
a terminal disposed on a terminal insulating film that is disposed on the first substrate, the terminal being provided at least in the portion of a region on the first substrate in which the planarizing film is not formed, wherein the terminal is used for connection with a mounting component, wherein the terminal includes:
a terminal body portion made of the same material as that of the signal wiring; and
a terminal insulating film made of the same material as that of the electrode insulating film, wherein the terminal insulating film is formed on the terminal body portion so as to at least cover a side face of the terminal body portion.

8. A liquid crystal device comprising:
a first substrate;
a second substrate that is opposed to the first substrate, wherein the first substrate and the second substrate hold liquid crystal therebetween;
a switching element;
a signal wiring that is connected to the switching element;
a planarizing film made of insulating film, wherein the planarizing film has a flatness and is provided above the signal wiring and the switching element;
a first electrode that is provided above the planarizing film;
an electrode insulating film that is provided above the first electrode;
a second electrode that is provided above the electrode insulating film and has a plurality of slits, wherein the second electrode generates an electric field that passes through the slits between the first electrode and the second electrode, wherein the switching element, the signal wiring, the planarizing film, the first electrode, the electrode insulating film and the second electrode are formed on or above the first substrate; and
a terminal that is provided at least in a portion of a region on the first substrate in which the planarizing film is formed, wherein the terminal is used for connection with a mounting component, wherein the terminal includes:
a terminal body portion that is made of the same material as that of the signal wiring;
an opening that opens in the planarizing film on the terminal body portion;
a terminal insulating film made of the same material as that of the electrode insulating film, wherein the terminal insulating film is formed so as to cover the planarizing film and to open at the opening; and
a terminal electrode portion made of the same material as that of the second electrode, wherein the terminal electrode portion is electrically connected to the terminal body portion through the opening.

9. The liquid crystal device according to claim 1, wherein the mounting component is connected through the terminal.

10. An electronic apparatus having the liquid crystal device according to claim 1.

* * * * *